(12) United States Patent
Kadota

(10) Patent No.: US 7,734,057 B2
(45) Date of Patent: Jun. 8, 2010

(54) DATA PROCESSING METHOD

(75) Inventor: Masatoshi Kadota, Takahama (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 1578 days.

(21) Appl. No.: 10/830,083

(22) Filed: Apr. 23, 2004

(65) Prior Publication Data

US 2004/0213432 A1    Oct. 28, 2004

(30) Foreign Application Priority Data

Apr. 25, 2003    (JP)    ............................... 2003-122127

(51) Int. Cl.
*G06K 9/00*    (2006.01)
(52) U.S. Cl. ..................................... 382/100
(58) Field of Classification Search ................. 382/100
See application file for complete search history.

(56) References Cited

U.S. PATENT DOCUMENTS 5,974,548 A * 10/1999 Adams ........................ 713/186
6,504,955 B2    1/2003 Oomura et al.
6,744,905 B1 * 6/2004 Horiike ...................... 382/100

FOREIGN PATENT DOCUMENTS

| JP | A 11-149355 | 6/1999 |
| JP | A 11-268371 | 10/1999 |

* cited by examiner

*Primary Examiner*—Tom Y Lu
(74) *Attorney, Agent, or Firm*—Oliff & Berridge, PLC

(57) ABSTRACT

When attaching a watermark to image data including a non-background object and a background object, first the watermark is drawn, and next the background object is drawn. Then, the watermark is drawn again after the background object has been drawn. Thereafter, the non-background object is drawn.

48 Claims, 18 Drawing Sheets

BITMAP DRAWING RECORD

TEXT DRAWING RECORD

PROCESSING INFORMATION

MAIN IMAGE

WATERMARK

BACKGROUND OBJECT (NON-BACKGROUND) OBJECT

WATERMARK IS HIDDEN BY BACKGROUND OBJECT
SO IS NOT DISPLAYED

DATA PROCESSING METHOD

BACKGROUND OF THE INVENTION

1. Field of the Invention

The present invention relates to a method of attaching an additional image to a one-page image obtained by drawing one or more objects including a bitmap object, in a predetermined sequence, and also to a processing system that uses the method.

2. Related Art

During the printing of a document or the like created by application software, a technique is known in the art of attaching an additional image called a watermark to an image of the document that is to be printed (hereinafter called a "main image"). The watermark could be text, such as "Company Secret", "Copy", or "Confidential".

The attachment of a watermark is a function that is generally incorporated within a dedicated driver software for a printing device (such as a printer). When it comes to printing a document created by the application software, a main image with a watermark attached thereto is output for printing by a user specifying an instruction to attach a watermark from a print setting screen of the driver software and also selecting a watermark that is to be attached.

Watermarks could of course be formed of text data, but the watermarks could also be created as image data in a format such as a bitmap. In addition, although such watermarks could be provided by a driver software as default, a user could also create them new.

When a watermark is attached to a main image, the watermark could either be attached in front of the main image (hereinafter called "forward attachment") or be attached behind the main image (hereinafter called "rearward attachment"). Depending on the driver software, the configuration could be such that the user can select either of these methods, but a default setting of rearward attachment is usually common.

With forward attachment, as shown specifically in FIG. 21(a), the main image is drawn first and finally the watermark is drawn on top of the main image (overwriting), so the watermark has priority in portions at which the main image and the watermark are overlaid, erasing the portions of the main image.

With rearward attachment, as shown specifically in FIG. 21(b), the watermark is drawn first and the main image is drawn over the watermark, so the main image has priority in portions at which the main image and the watermark are overlaid, erasing the portions of the watermark.

A main image created by presentation software, however, generally include of a background object representing a background (an object in bitmap format) and various objects for the presentation, which are drawn overlapping on the background object.

In other words, when a main image of such a configuration is finally rasterized by a printing device, first a background object is drawn and then various other objects are drawn on top of the background object. In general, a background object is often drawn over a comparatively wide range of one page, and a background object could even cover the entire page.

For that reason, if the rearward attachment is employed when outputting such a main image with a watermark attached thereto for printing, it is highly likely that the watermark will hide behind the background object. If the region in which the watermark is drawn is completely comprised within the region in which the background object is drawn, the watermark will be overdrawn by the background object and will be completely erased thereby, as shown in FIG. 21(c).

If the background object in this case is colored, a user seeing the printed result can confirm visually that "the watermark has been erased by the background", and it is also possible that the user might wish to erase the watermark intentionally with the background.

However, it is also possible to have a background object that is a completely white area or just a frame surrounding white (in the example shown in FIG. 21(c), the background object is completely white except for the frame). Since it would seem to the user that there is nothing drawn in that white area in such a case, the user would be unaware that the white background object has been drawn there in practice and would naturally expect to see the watermark printed in that white portion (which is actually a white background object).

However, in practice the watermark is overwritten by the white background object (the white bitmap object) and is not printed. In other words, from the user's viewpoint, the printed result might cause the user to wonder whether there is a fault in the driver software or the printing device, raising feelings of unease and inconvenience, since there is no watermark drawn in the white area that is supposed to have a watermark drawn therein.

In order to overcome this problem, Japanese Patent-Application Publication No. HEI-11-149355 proposes a technique that is to determine, for a character string object within one page, whether or not it is a character string object that is either not overlaid by another object or not requiring consideration of overlapping, to ensure that each character string object that is overlaid by another object and requiring consideration of overlapping is printed reliably.

This technique ensures that the watermark is printed above another object when the another object overlaps the watermark. However, since this technique does not determine whether the another object is a background or an object that is not a background, the watermark is always drawn at the front.

For that reason, if the above-described technique is used for attaching a watermark to a main image created by presentation software when printing out, the watermark is printed reliably, but main objects other than the background would be hidden by the watermark, which is not in line with the user's intentions of "I want to print a watermark but I also want to print all non-background objects reliably."

It is also conceivable to use the previously-described forward-attachment for displaying the watermark reliably. However, in this case, the watermark will be displayed unconditionally at the foremost position, giving rise to a similar problem to the above (in that objects other than the background are also covered by the watermark), which is not in line with the user's intentions.

SUMMARY OF THE INVENTION

It is an object of the present invention to overcome the above problems and also to implement the drawing of an additional image in line with the user's intentions, by drawing an additional image, such as a watermark, without hiding the additional image behind a background object and without hiding other objects, that are drawn further forward than the background object, behind the additional image.

Note that "image" in this case does not only mean an image that is visible to the eyes, but it also refers to the data that represents such an image. In this case, (when it means data), "draw" does not only mean the literal draw that is to draw to make visually recognizable, but it also refers to various data conversions based on image data for the image to be drawn, such as an expansion into bitmap format data, a conversion into page description language (PDL) data, or a data expansion into a virtual drawing region (such as memory).

In order to attain the above and other objects, according to one aspect of the present invention, there is provided an attaching method of attaching an additional image to a one-page image that is obtained by drawing one or more objects including at least one bitmap object in bitmap format in a predetermined sequence. The attaching method includes a) determining whether or not an object that is to be drawn is a bitmap object, b) if the object is determined to be a bitmap object in the step a), determining whether or not the object is a background object representing a background of the one-page image, and c) if the object is determined to be a background object in the step b), drawing an additional image after drawing the background object.

According to other aspect of the present invention, there is provided a drawing processing system including: storing means for storing a recode file for one-page image, the record file including object records each representing an object; record fetching means for fetching the object records one-by-one in a predetermined sequence from the record file; object drawing means for analyzing the object record fetched by the record fetching means and for drawing an object of the object record; determination means for determining whether or not an object corresponding to the object record fetched by the record fetching means is a background object in a bitmap format, the background object representing a background; and additional image drawing means for drawing an additional image. If the determination means has determined that the object is a background object, the additional image drawing means draws the additional image after the object drawing means has drawn the object that was determined to be the background object.

According to still other aspect of the present invention, there is provided a storing medium for storing a program of attaching an additional image to a one-page image that is obtained by drawing one or more objects including at least one bitmap object in bitmap format in a predetermined sequence. The program includes the programs of a) determining whether or not an object that is to be drawn is a bitmap object, b) if the object is determined to be a bitmap object, determining whether or not the object is a background object representing a background of the one-page image, and c) if the object is determined to be a background object, drawing an additional image after drawing the background object.

There is also provided a drawing processing device including: storing means for storing a recode file for one-page image, the record file including object records each representing an object; record fetching means for fetching the object records one-by-one in a predetermined sequence from the record file; object drawing means for analyzing the object record fetched by the record fetching means and for drawing an object of the object record; determination means for determining whether or not an object corresponding to the object record fetched by the record fetching means is a background object in a bitmap format, the background object representing a background; and additional image drawing means for drawing an additional image. If the determination means has determined that the object is a background object, the additional image drawing means draws the additional image after the object drawing means has drawn the object that was determined to be the background object.

BRIEF DESCRIPTION OF THE DRAWINGS

In the drawings:

FIG. 6($b$) is illustrative of printed result of the sequential drawing of FIG. 6($a$);

FIG. 21($b$) is illustrative of the results of printing a watermark attached to a main image by rearward attachment.

DETAILED DESCRIPTION OF PREFERRED EMBODIMENTS

Preferred embodiments of the present invention are described below with reference to the accompanying drawings.

First Embodiment

Figure 1:
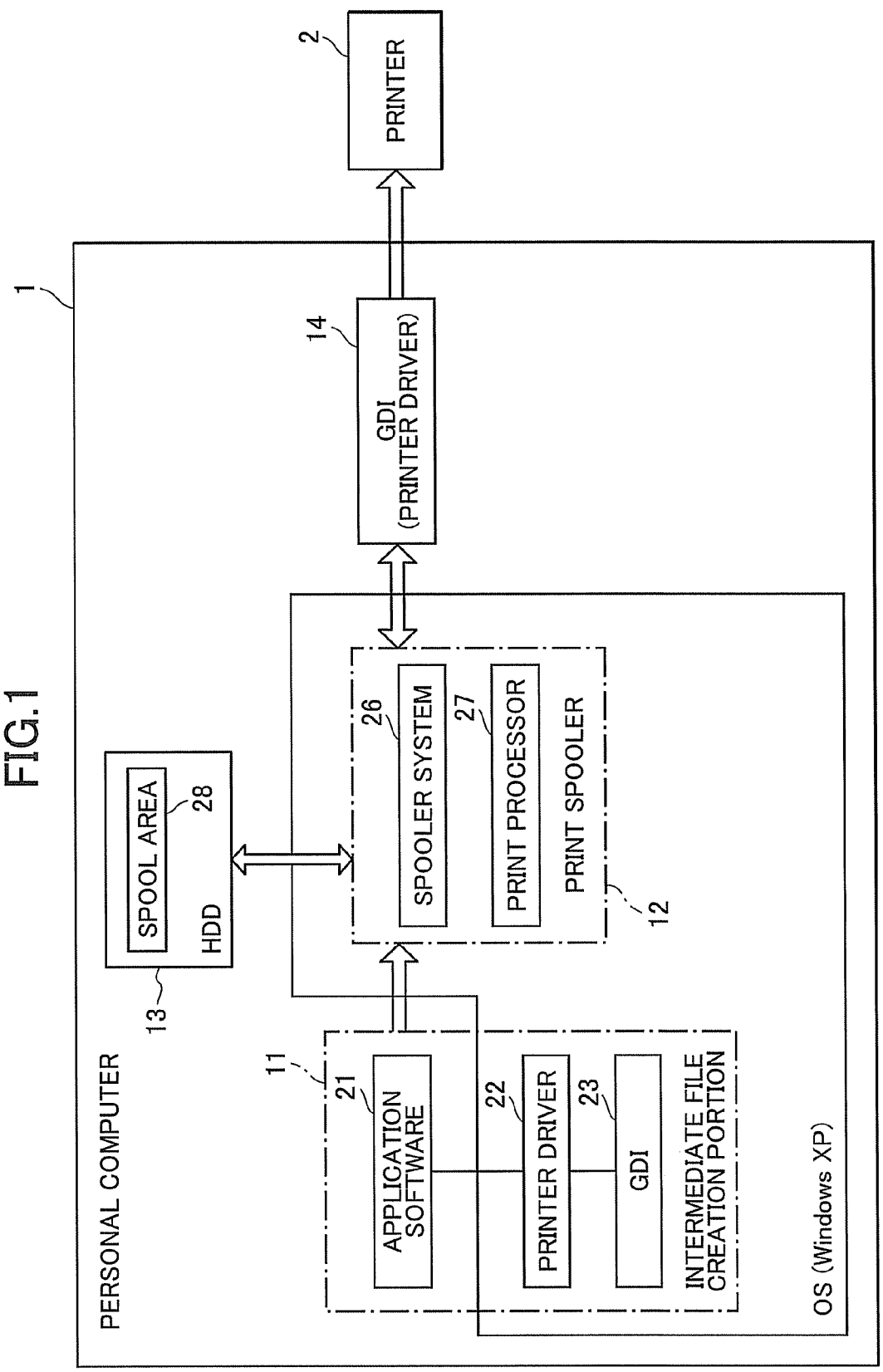
FIG. 1 is a block diagram of a software module configuration of a drawing processing system according to a first embodiment of the present invention.

FIG. 1 is a block diagram of a software module configuration of a drawing processing system according to a first embodiment of the present invention. In the present embodiment, an operating system (OS) of a personal computer (PC) 1 is Windows XP (trademark registered to Microsoft of the USA). An intermediate file creation portion 11 creates an intermediate file for printing, and a print spooler 12 temporarily stores (spools) the intermediate file in a spool area 28. A graphics device interface (GDI) 14 converts the spool file into printer command codes, depending on the operating state of a printer 2, and outputs them to the printer 2.

In general, the PC 1 is based on hardware such as a CPU, ROM, RAM, and I/O ports under the control of the OS, and application software and software for device drivers or the like operate under the OS. In this embodiment, a printer driver 22 and a GDI 23 within the intermediate file creation portion 11 and the print spooler 12 are program modules operating as functions of the OS, and the GDI 14 is a device driver (a printer driver) incorporated into the PC 1 for causing the printer 2 to operate and controls the operation of the printer 2 while cooperating with the OS.

A print processor 27 is a program module that is incorporated into the OS by being added (installed) to the PC 1 in correspondence to the printer 2, separately from a print processor (not shown in the drawings) that was originally provided to the OS (Windows XP). Note that in this embodiment, all of the various programs for implementing the drawing processing system in the PC 1 are stored in a hard disk (HDD) 13. The operation of the drawing processing system of this embodiment is described below.

As shown in FIG. 1, data that has been created by a user with application software 21 on the PC 1 is sent to the GDT 23, which is a program module provided for Windows XP, via the printer driver 22 of Windows XP. A device context (hereinafter abbreviated to DC) that is a virtual display region is created by the GDI 23 and is supplied to the application software 21. The application software 21 relates print data for each print job, which does not depend on the type of device (printer, display, etc.), with coordinates of a coordinate system of the DC and stores the print data, drawing to a virtual device.

The application software 21 is application-specific software that runs on the OS, such as wordprocessor software, spreadsheet software, or presentation software, but the description below of this embodiment assumes that the application software 21 is presentation software. For that reason, an image for a presentation that has been created by the application software 21 (presentation software) includes a background object that denotes a background and various presentation objects that are drawn over the background object, and a single (one-page) image is formed by drawing the objects in a predetermined sequence onto the background object.

In general, GDIs include one that is designed to perform DC management and enhanced meta file (EMF; an intermediate file) formation and one that generates commands that depend on the device (such as printer or display) for processing to DC. The former is provided by the OS and corresponds to the GDI 23 of FIG. 1, and the latter is supplied as a driver by the manufacturer of the device and corresponds to the GDI 14 (described later) of FIG. 1.

By drawing to the DC, which is a virtual device, in this manner, an EMF that is not dependent on the type of device is created for each page. These EMFs are linked by a spooler system 26 and are stored as a spool file in the spool area 28 reserved in the HDD 13, to form a single print job.

Note that it is not always necessary to reserve the spool area 28 within the hard disk 13 of the PC 1. For example, some sort of storage device could be provided externally to the PC 1, and part of the storage device could be reserved as the spool area 28. The configuration of the spool area 28 is not particularly limited, provided the spool area 28 can be managed from the PC 1.

Figure 2:
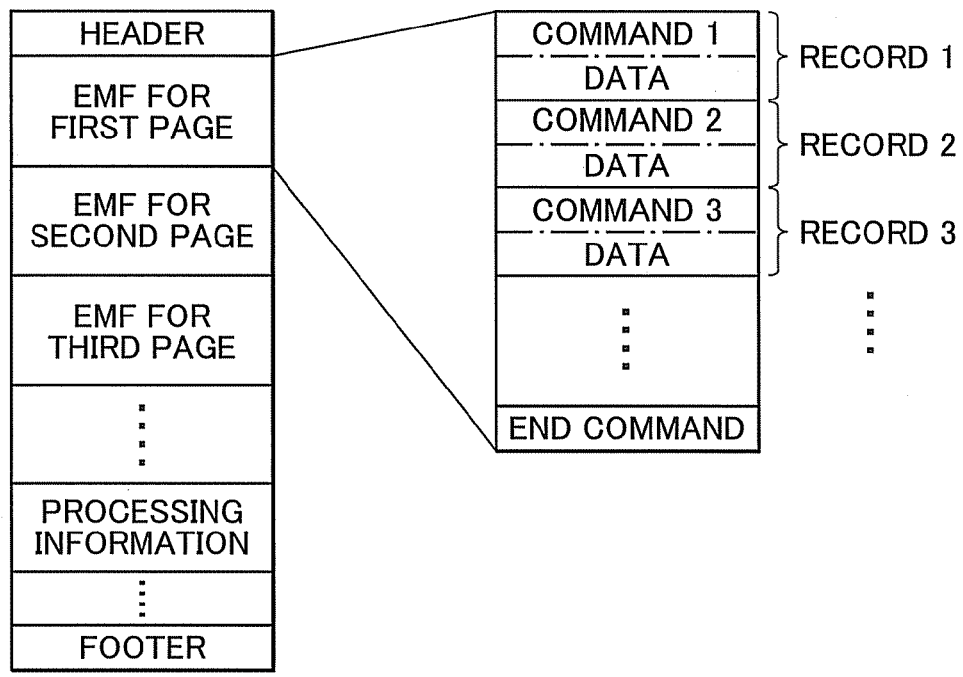
FIG. 2 is illustrative of a schematic configuration of a spool file according to the first embodiment of the present invention.

The spool file of this embodiment has the specific configuration shown in FIG. 2 and includes a header at the start and an EMF for each page. In addition to the EMFs, the spool file also includes processing information, and a footer is attached to the final part of the spool file. The processing information denotes what sort of processing (special printing, such as the attachment of additional images like a watermark or the substitution of pages) to perform when actually printing the image that was created by the user with the application software 21. In other words, if the user instructs special printing when sending data (image) created by the application software 21 to be printed by the printer 2, such instructions are attached to the spool file as processing information.

Figure 4:
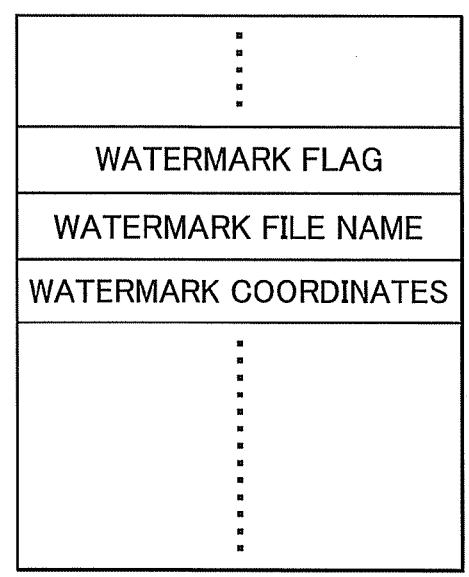
FIG. 4 is illustrative of a specific example of processing information attached to the spool file.

For example, if the user selects a special printing instruction that specifies the attachment of a watermark when instructing printing, then as shown in FIG. 4, various information relating to the watermark are attached to the spool file as processing information. In the example shown in FIG. 4, a watermark flag that indicates that a watermark is to be attached, a file name specifying the type of watermark, and watermark attachment coordinates (drawing coordinates) are attached to the spool file as the processing information.

Note that FIG. 4 only shows watermark-related information among various processing information. However, if special printing instructions other than a watermark attachment instruction have been performed in addition to the watermark attachment instruction, various items of information relating to the special printing instructions are attached as processing information together with the above-described watermark-related information. Note that the description below is based on the assumption that the processing information within the spool file consists only of the information relating to the attachment of a watermark (hereinafter called "watermark attachment information") shown in FIG. 4.

The footer of the spool file includes a document name corresponding to the spool file. The document name includes a file name of data created by the application software 21 and an extension, for example.

Although not shown in the drawings, at the head of the EMF for each page is provided a header for each page that is separate from the header of the spool file. The EMF for each page includes a plurality of records formed of commands and data, and an end record.

The description now turns to more specific details of EMF, taking the EMF for the first page as an example. The EMF for the first page includes records 1, 2, 3, . . . , arrayed in this order.

Each record 1, 2, 3, . . . , is data representing one of the objects that form the image for the first page.

In other words, the image for the first page is drawn finally by drawing from record 1 onward in sequence.

Figure 3A:
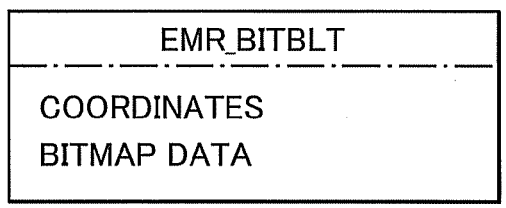
FIGS. 3($a$) and 3($b$) are is illustrative of specific examples of record that configure an EMF.
Figure 3B:
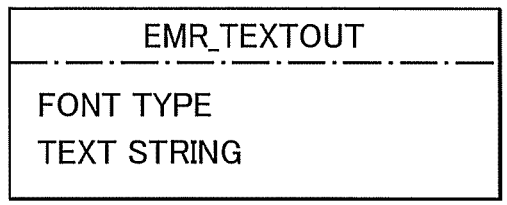

Each record 1, 2, 3, . . . , is could be one of different types of record, such as a bitmap drawing record in FIG. 3(*a*) that denotes a bitmap object, a text drawing record shown in FIG. 3(*b*) that denotes text data, other types of record (not shown in the drawings) including records corresponding to varieties of objects, such as a line-drawing record that denotes a line object and a circle-drawing record that denotes a circle object, and a command record that does not denote an object but denotes various instructions.

Each record includes a command that denotes the type of the record and data that denotes the specific details of the record. For example, the bitmap drawing record shown in FIG. 3(*a*) includes a command portion EMR_BITBLT denoting that the record corresponds to a bitmap object and a data portion denoting specific details of the bitmap object (coordinates and bitmap data), and the text drawing record shown in FIG. 3(*b*) includes a command portion EMR_TEXTOUT denoting that the record corresponds to a text object and a data portion denoting specific details of the text object (font type and a text string).

The spool file stored in the spool area 28 is sent by the print processor 27 to the GDI 14. The GDI 14 coverts the EMF of each page of the spool file into PDL codes that are printer-control commands corresponding to the printer 2 (such as PCL (registered tradename) of the Hewlett-Packard company of the US) and sends the PDL codes to the printer 2.

Since the specifications of the printer control commands differ for each manufacturer, the spool file including an EMF for each page is converted by the GDI 14 into printer command codes (PDL codes) in accordance with the PDL used by the printer 2, to ensure that PDL codes conform to the PDL used by the printer 2.

The conversion by the GDI 14 into PDL codes is performed in cooperation with the OS. That is, when the GDI 14 has received the spool file from the print processor 27, the GDI 14 calls the OS and has the OS rasterize the spool file (convert the spool file into raster data). The thus-rasterized raster image is converted by the GDI 14 into PDL codes.

The rasterization by the OS is performed while sequentially analyzing the records of the EMF of each page (in sequence from record 1, in the example shown in FIG. 2). However, since watermark attachment information is attached to the spool file as processing information in this embodiment, the watermark denoted by the watermark attachment information is rasterized before the rasterization based on the records. After the watermark has been rasterized, the rasterization starts in sequence from record 1.

In this embodiment, the user can not only just select whether or not a watermark is attached, but also whether the watermark is drawn behind the other objects (that is, rearward attachment) or in front of the other objects (that is, forward attachment). In addition, if the rearward attachment it selected, it is further possible to specify whether or not the watermark is drawn in front of the background object.

Figure 5:
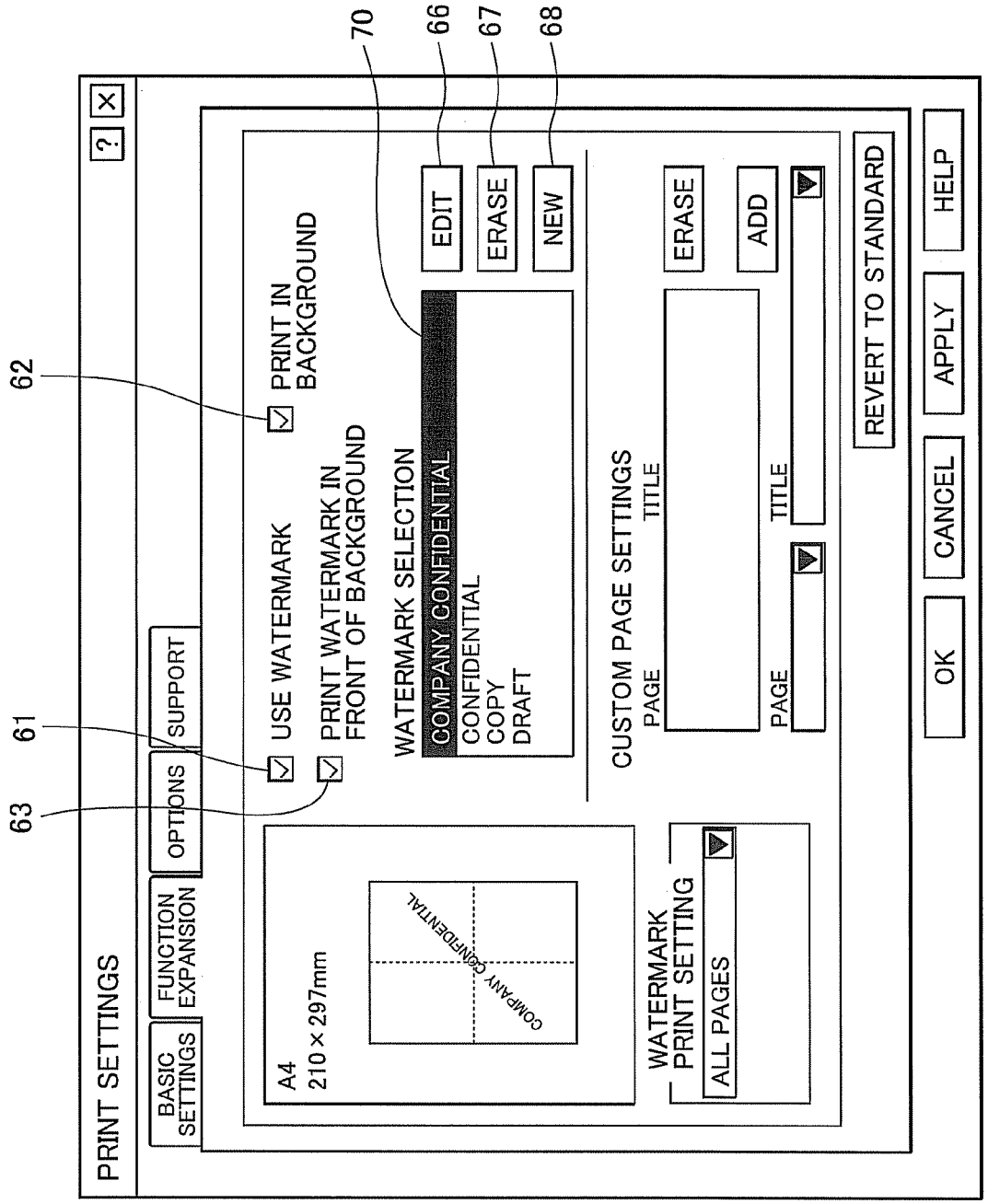
FIG. 5 is illustrative of an example of a print setting screen for making various settings relating to watermarks.

FIG. 5 shows an example of a print setting screen for performing the above-described settings relating to the watermark in accordance with this embodiment. As shown in FIG. 5, this embodiment enables various settings relating to the watermark on the print setting screen during the output for printing of image data created by the application software 21. If the user wishes to attach a watermark to the printout, then the user first checks a "Use watermark" checkbox 61 and then selects the watermark to be attached from a watermark selection menu 70.

The watermarks offered in the watermark selection menu 70 include that registered beforehand as defaults and also that the user has created anew and registered. The data formats of the watermarks include bitmap format, text format, and the like. An edit button 66, an erase button 67, and a new button 68 are provided, for editing, erasing, or creating such watermarks.

If a "Print in background" checkbox 62 is not checked, then the watermark is drawn by forward attachment, whereas if the "Print in background" checkbox 62 is checked, then the watermark is drawn by rearward attachment. If a "Print watermark in front of background" checkbox 63 has also been checked in addition to the "Print in background" checkbox 62, then the watermark is drawn by the rearward attachment, but the watermark is drawn once again when the background object has been drawn.

In other words, this embodiment ensures that if all three of the above-described checkboxes 61 to 63 are checked when a watermark is attached to an image that includes a background object and other objects and that is created by presentation software, and the watermark is drawn in front of at least the background object but not drawn as the foremost object.

Note that the description below assumes that all of the checkboxes 61 to 63 have been checked as shown in FIG. 5. Note also that information relating to whether or not those checkboxes 61 to 63 have been checked has been omitted from FIG. 4 but is attached to the processing information of the spool file as the watermark attachment information.

When the spool file is rasterized and the resultant raster image is converted into PDL codes by the GDI 14, first of all the watermark is rasterized, based on the checking of the "Use watermark" checkbox 61 and the "Print in background" checkbox 62.

The watermark to be rasterized in this case is the one specified as the watermark file name in the processing information (FIG. 4). Data denoting watermarks that can be used by the drawing processing system (in other words, watermarks that can be selected from the setting screen of FIG. 5) are stored in the HDD 13, and data for the watermark corresponding to the watermark file name given in the processing information is read from the HDD 13 and rasterized.

After the rasterization of the watermark, rasterization based on the records of the EMF a single page is performed. In this example, the records include a record denoting the background object because the image has been created by the presentation software as described previously. Note that the background object of this embodiment is an object in bitmap format.

For that reason, if the background object is rasterized after the rasterization of the watermark, the watermark will be overwritten with the background object and erased, However, according to the present embodiment, if the background object is rasterized after the rasterization of the watermark and if the "Print watermark in front of background" checkbox 63 shown in FIG. 5 has been checked, then the watermark is rasterized again.

However, if part or all of the watermark is overwritten when non-background objects are rasterized, the watermark is not re-drawn and remains as is. In other words, the watermark is rasterized again only if the background object has been rasterized. The thus-rasterized image is converted into PDL codes by the GDI 14 and output to the printer 2. The printer 2 interprets these PDL codes and prints them out on printing paper 50 (FIG. 6).

Figure 6:
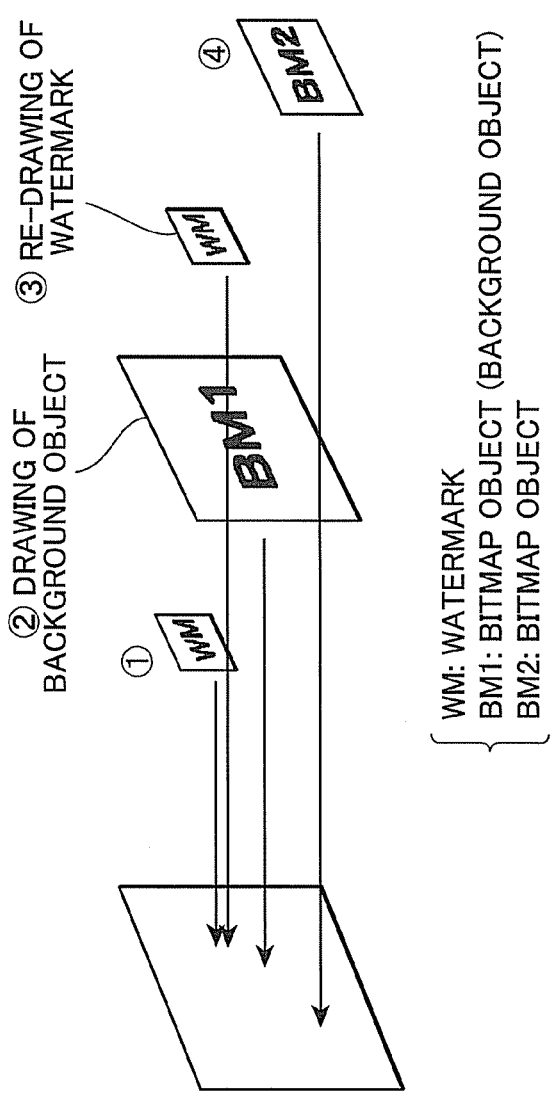
FIG. 6($a$) is illustrative of the sequential drawing relationship between a watermark and other objects.

FIG. 6(*a*) schematically shows how a watermark is printed without being hidden by the background object. In this example, when drawing (rasterizing) based on the spool file, the watermark is drawn first (①). After the background object (bitmap object) is drawn. (②), the watermark is drawn again (③). The objects other than the background object (in this example, bitmap objects) are then drawn (④).

Accordingly, one page of image is created (printed) on the printing paper 50 as shown in FIG. 6(*b*). In other words, the watermark drawn at ① is erased by the drawing of the background object at ②, but the watermark is drawn again at ③. The bitmap objects drawn at ④ partially overlay the watermark drawn at ③, but the bitmap objects drawn at ④ have priority at those overlapping parts.

Figure 7:
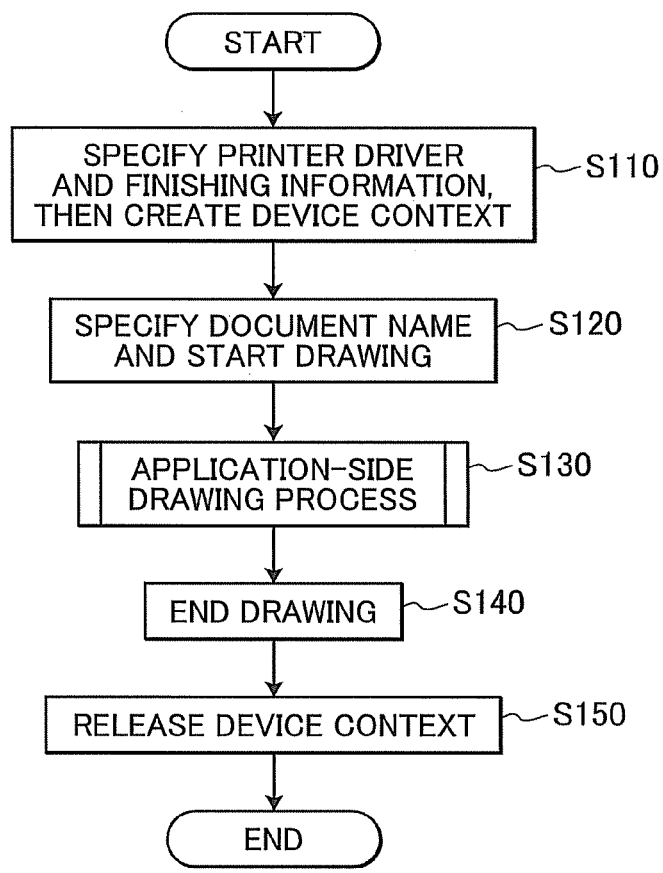
FIG. 7 is a flowchart representing an EMF creation process according to the first embodiment of the present invention.

An EMF creation process executed by the application software 21 in the drawing processing system of the present embodiment described above will be described with reference to FIG. 7. FIG. 7 is a flowchart representing the EMF creation process of this embodiment. The EMF creation process is executed by the execution of the corresponding program by the PC 1 when the user has specified the printout of data created by the application software 21.

When the EMF creation process starts, first in S110, the printer driver and the processing information are specified based on a print instruction from the user, and a device context (DC) is created. The OS generates the processing information for the spool file (FIG. 4) based on thus-specified printer driver and processing information.

In S120, the document name of the data created by the application software 21 is specified, and also drawing starts with respect to the DC created in S110. The OS inserts the document name into the footer of the spool file (FIG. 3) based on the specified document name.

Figure 8:
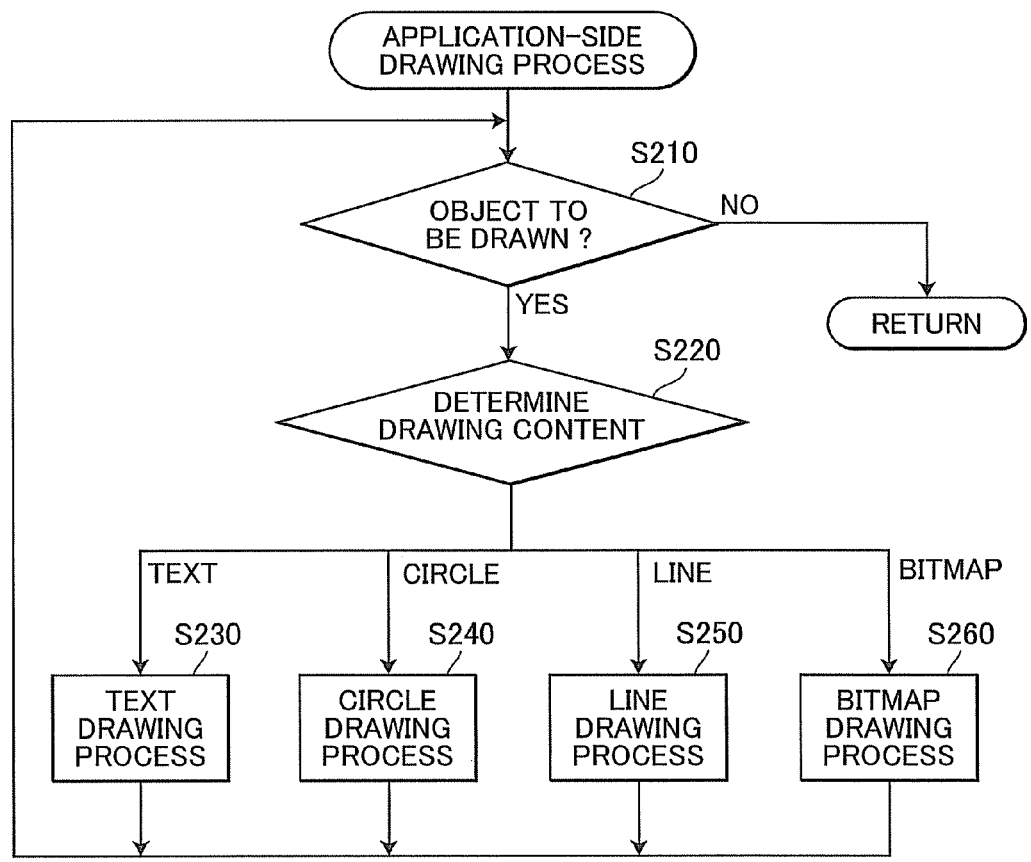
FIG. 8 is a flowchart representing an application-side drawing process that is performed in S130 of the EMF creation processing of FIG. 7.

In S130, an application-side drawing process is performed. The application-side drawing process is a drawing process with respect to the DC. FIG. 8 shows a flowchart representing the application-side drawing process. Specifically, first in S210, it is determined whether or not there is an object to be drawn. If there is no more object to be drawn (S210:NO), this means drawing of all the objects to the DC has been done. However, if there is an object to be drawn (S210:YES), then the process proceeds to S220.

In S220, the details of the next drawing object to be drawn to the DC are determined. If the next drawing object is a text object, then the process proceeds to S230 and a drawing process (drawing to DC) is performed for the text object. If the next drawing object is a circle object, then the process proceeds to S240 and a drawing process performed for the circle object. If the next drawing object is a line object, then the process proceeds to S250 and a drawing process is performed for the line object. If the next drawing object is a bitmap object, then the process proceeds to 5260 and a drawing process is performed for the bitmap object.

After the drawing process corresponding to each of the objects has been done (S210:NO), the process returns to FIG. 7 and the drawing to the DC ends (S140). In S150, the DC is released, and this process ends. As a result, EMFs are created for all of the pages. The EMFs created by the EMF creation process of FIG. 7 are linked by the spooler system 26 and spooled to the spool area 28 of the HDD 13 as a spool file corresponding to one job.

Figure 9:
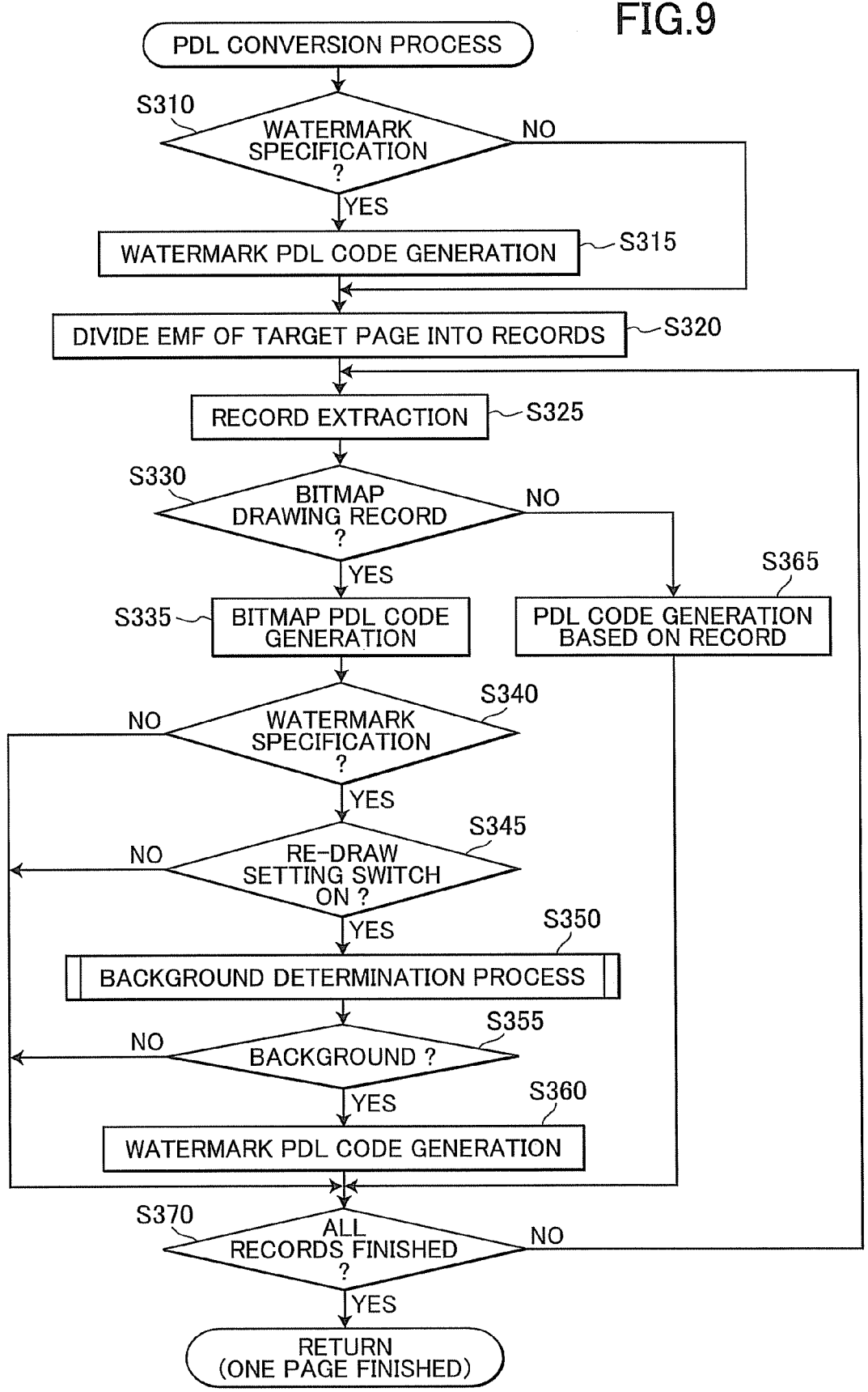
FIG. 9 is a flowchart representing a PDL conversion process according to the first embodiment of the present invention.
Figure 10:
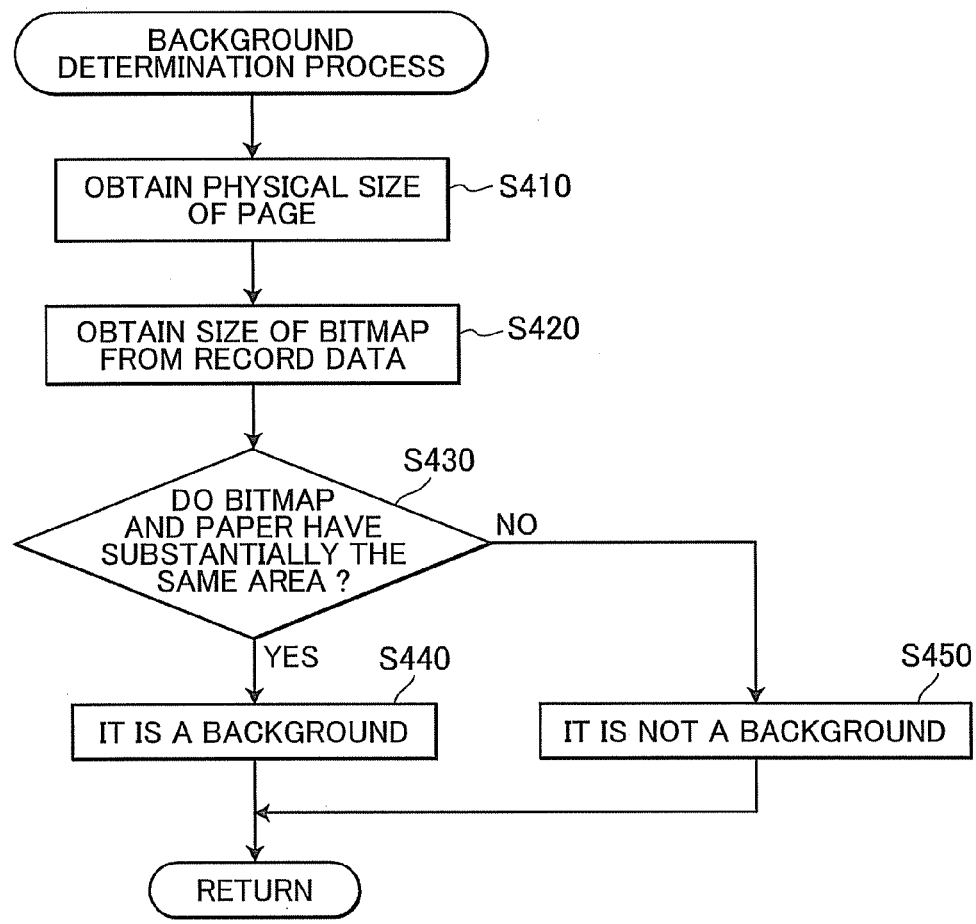
FIG. 10 is a flowchart representing a background determination process that is performed in S350 of the PDL conversion process of FIG. 9.

The description now turns to a PDL conversion process performed by the GDI 14 to convert the above-described spool file into PDL codes, with reference to FIGS. 9 and 10. The PDL conversion process is executed for each EMF of each page of the spool file by the PC 1 executing programs for implementing the functions of the GDI 14. When the PDL conversion process starts, first in S310, it is determined whether or not attachment of a watermark has been specified. This determination is made based on the processing information within the spool file. Since watermark attachment information shown in FIG. 4 is attached as processing information in this example, a positive determination is made in S310 (S310:YES), and the process proceeds to S315. In S315, PDL codes for a specified watermark are generated, and then the process proceeds to S320. However, if there is no watermark attachment information, then the negative determination is made in S310 (S310:NO), and the process proceeds to S320.

Note that PDL codes are created in the above-described manner. That is, first the GDI 14 calls the OS to have the OS rasterize the object and then the GDI 14 converts the raster image into PDL codes. PDL codes are generated in the same manner in S335, S365, and S360 that will be described later.

In S320, the EMF of the target page is divided into records, and one of the records is extracted in S325. In S330, it is determined whether or not the current record extracted in S325 is a bitmap drawing record corresponding to a bitmap object. If the record is not a bitmap drawing record (S330:NO), then the process proceeds to S365 and PDL codes are generated based on the record. On the other hand, if the record is a bitmap drawing record (S330:YES), then the process proceeds to S335 and PDL codes are generated based on the bitmap drawing record.

In both S335 and S365, the corresponding PDL codes are generated by analyzing the details of the record that was extracted in S325, but PDL codes representing the bitmap drawing object are generated in S335.

In S370, it is determined whether or not all of the records divided in S320 have been turned into PDL codes. If there is still a record that has not been converted into PDL codes (in other words, if there is a record that has not been extracted in S325) (S370:NO), the process returns to S325. If all of the records have been converted into PDL codes (S370:YES), then this means that the PDL conversion for the EMF of one page is complete, and the PDL conversion process ends temporarily. Then, he PDL conversion process is executed in the same way for the EMFs of subsequent pages.

After S335, it is determined in S340 whether or not the attachment of a watermark has been specified, in the same manner as in S310. If attachment of a watermark has not been specified (S340:NO), then the process proceeds to S370. On the other hand, if attachment of a watermark has been specified (S340:YES), the process proceeds to S345. In S345, it is determined whether or not a watermark re-draw setting switch has been set to "ON".

The re-draw setting switch indicates whether or not the "Print watermark in front of background" checkbox 63 of the print setting screen shown in FIG. 5 has been checked. If the "Print watermark in front of background" checkbox 63 has been checked, the re-draw setting switch is "ON" (S345:YES), and the process proceeds to S350. If the "Print watermark in front of background" checkbox 63 has not been checked, the re-draw setting switch is "OFF" (S345:NO), then the process proceeds to S370.

In S350, a background determination process is performed to determine whether or not the bitmap object corresponding to the bitmap drawing record that was converted into the PDL codes in S335 is a background object that represents the background. FIG. 10 shows a flowchart representing the background determination process. When the background determination process starts, first in S410, the physical size of the printing paper 50 (the area of the print surface) is obtained by the printer driver calling the application program interface (API) of the OS.

In S420, the size of the bitmap object is obtained based on the bitmap drawing record that is being processed. Since bitmap data of a bitmap drawing record is rasterized, size information along the x-axis and the y-axis is stored as x-y coordinates in the bitmap data itself. The size of the bitmap object can be obtained by retrieving the size information.

In S430, it is determined whether or not the bitmap object has substantially the same area (size) as the paper 50. In this embodiment, it is determined whether or not the drawing region of the bitmap object is at least 80% of the surface area of the paper 50, and determined that they have substantially the same area if the drawing region of the bitmap object is 80% or greater of the surface area of the paper 50. If it is determined in S430 that they have substantially the same area (S430:YES), then it is determined in S440 that the bitmap object is a background object. This is because a bitmap object that is substantially the same size as the paper 50 is highly likely to be a background object. If it is not determined in S430 that they have substantially the same area (S430:NO), then it is determined in S450 that the bitmap object is not a background object. Then, the process returns.

Returning to FIG. 9, it is determined in S355 whether or not the bitmap object is a background object based on the background determination process result of S350. If the bitmap object is not a background object (if it is determined in S450 of FIG. 10 that the bitmap object is not a background object) (S355:NO), then the process proceeds to S370. If the bitmap object is a background object (S355:YES), then the process proceeds to S360, and PDL codes for the watermark are generated. The PDL codes generated in S360 are identical to that generated in S315.

The thus-obtained group of PDL codes includes not just the PDL codes of the EMF, but also PDL codes relating to the watermark. In addition, the configuration is such that the watermark is always drawn after the background object has been drawn, provided the "Print watermark in front of background" checkbox 63 of the print setting screen shown in FIG. 5 has been checked. Therefore, when the printer 2 analyzes and prints out this group of PDL codes, the watermark is drawn in front of the background object.

Figure 11:
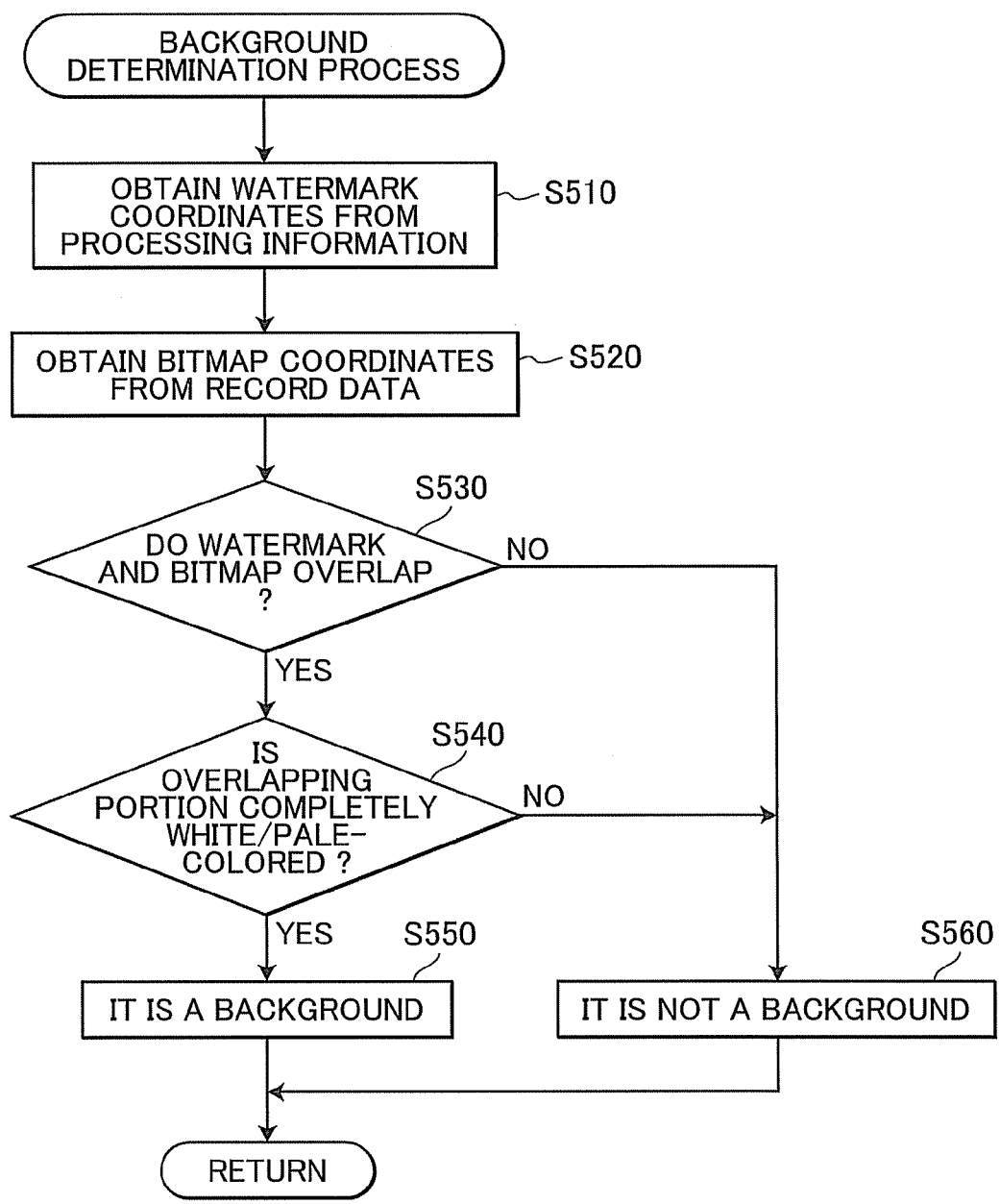
FIG. 11 is a flowchart representing another example of a background determination process.

Note that the background determination process of S350 could be done by a method other than that illustrated in FIG. 10, such as that of FIG. 11. That is, as shown in FIG. 11, the coordinates of the watermark are obtained in S510 from the processing information within the spool file. The coordinates of the bitmap object (drawing position) are then obtained in S520 from the record data of the bitmap drawing record.

In S530, it is determined whether or not there is a portion where the watermark and the bitmap object are drawn overlapping, based on the coordinates obtained in S510 and S520. If there is no overlapping portion (S530:NO), then the process proceeds to S560 and it is determined that the bitmap object is not a background object. On the other hand, if there is an overlapping portion (S530:YES), then the process proceeds to S540. In S540, it is determined whether or not the entire overlapping portion of the bitmap object is white or a pale color. This determination is made by determining whether or not all of the RGB colors are greater than a predetermined brightness, for example.

If it is determined in S540 that the overlapping portion is not entirely white nor a pale color (S540:NO), then the process proceeds to S560 and it is determined that the bitmap object is not a background object. On the other hand, if the entire overlapping portion is determined to be white or a pale color in S540 (S540:YES), then the process proceeds to S550, and the bitmap object is determined to be a background object, taking the expectation of a user that a watermark should be printed in at least white or pale-colored portions of a background, which might not be recognized as a background, into consideration.

As described above, in the drawing processing system according to the first embodiment, when the printer driver (the GDI 14) converts a spool file into the PDL codes, if a background object is drawn (rasterized and converted to PDL codes) after a watermark has been drawn, then the watermark is drawn again. This makes it possible to implement the drawing of a watermark in line with the user's intentions, by drawing the watermark without hiding the watermark by a background object and without hiding other objects, that are drawn further forward than the background object, by the watermark, even if it is in bitmap format.

The determination of whether or not a bitmap object is a background object is made based on either a proportion with respect to the surface area of the printing paper 50 or a color of the portion that overlaps the watermark. With either determination method, it is possible to determine reliably whether or not a bitmap object is a background object, thus making it possible to implement the drawing of a watermark in line with the user's intentions.

In particular, since the determination by color is such that a bitmap object is determined to be a background object if the overlapping portion is completely white or a pale color, the effects of the watermark on objects other than the background object (such as overwriting of a colored object by the watermark) can be suppressed.

Second Embodiment

In the above-described first embodiment, the background determining process of FIG. 10 or FIG. 11 is performed to determine whether or not a bitmap object is a background object, based on the relationship between the bitmap object size and the area of the paper 50 or based on the color of the overlapping portion of the bitmap object and the watermark.

However, it could happen in the above-described background determining processes that an object other than the background object is substantially the same size as the printing paper 50, for example, and that the object is determined to be a background object. In such a case, the watermark would be written over the object, even though the intention was to have the object in the foreground.

To ensure reliable determination of whether or not an object is a background object, according to a second embodiment, a comparison between the bitmap object that is currently being processed and a background file (background data) possessed by the application software 21 (accurately stored on the HDD 13) is performed, and it is determined that the bitmap object is a background object if the bitmap object matches the background file.

Note that the drawing processing system of this embodiment has the same basic software module configuration as that shown in FIG. 1, but a background determination process executed by the printer driver (the GDI 14) during the PDL code conversion differs. In other words, in this embodiment also, the PDL conversion process of FIG. 9 is executed, but a process shown in FIG. 13 is executed as the background determination process in S350.

Figure 13:
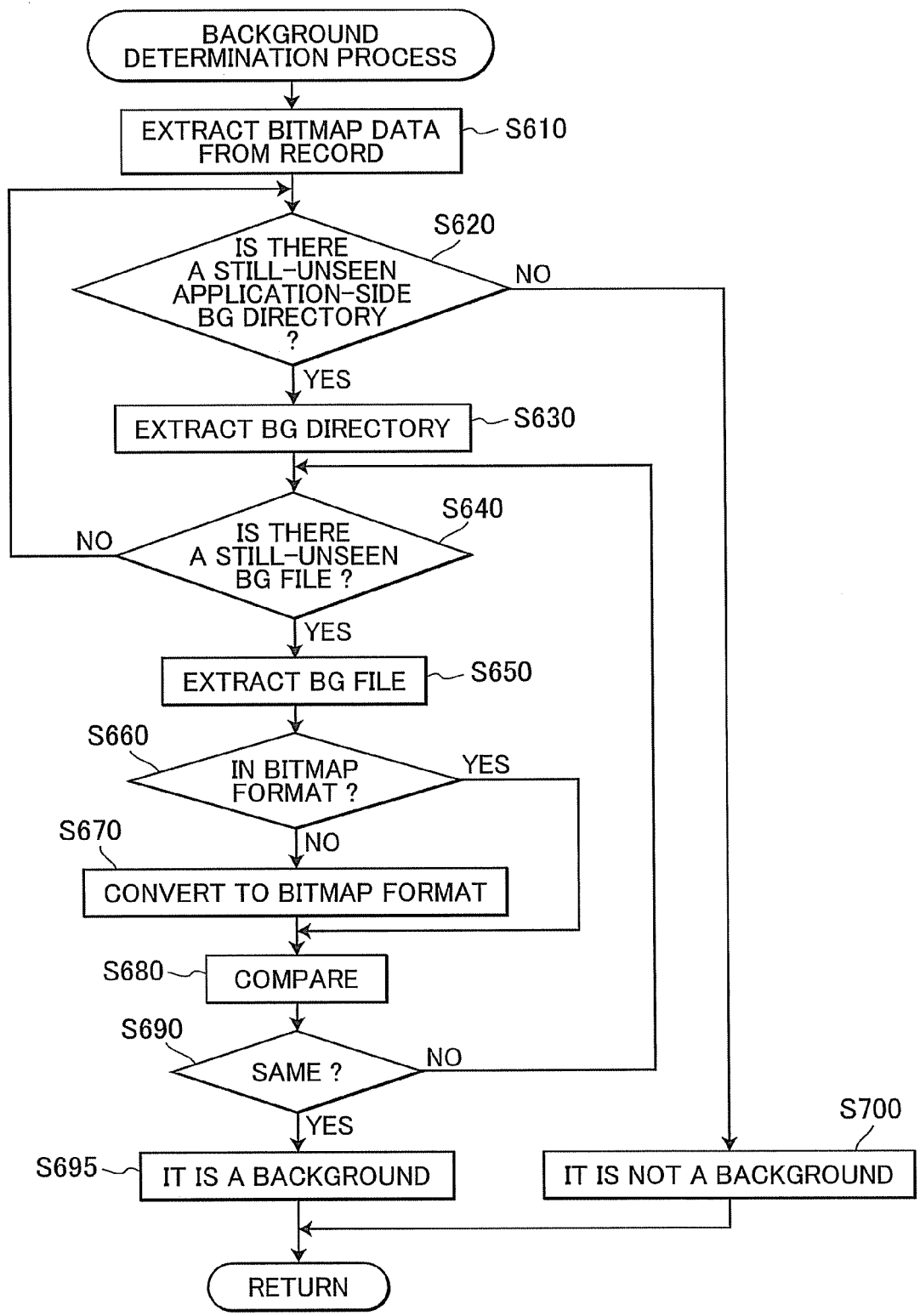
FIG. 13 is a flowchart representing a background determination process according to the second embodiment of the present invention.

When the background determination process of FIG. 13 starts, first in S610, bitmap data is extracted from a bitmap drawing record (the record that is determined to be a bitmap drawing record in S330 of FIG. 9). In S620, it is determined whether or not there is a still-unseen file in a directory that contains background files for each type of application software 21.

In other words, the application software 21 is a plurality of applications, including presentation software, and each application usually has its own background file (image data that is used as a background object). When the application software 21 is installed on the PC 1, the background file of each application is stored in a predetermined directory for each type of application.

Figure 12:
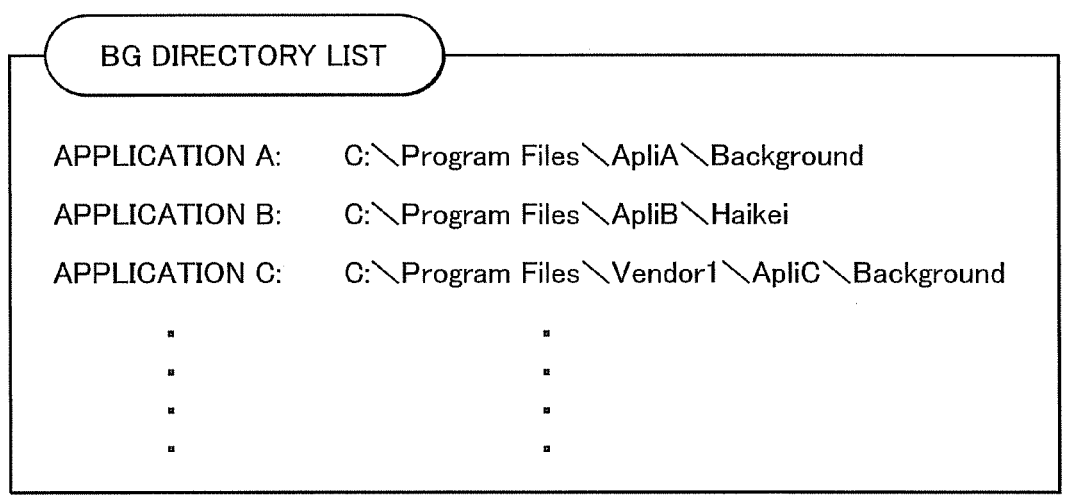
FIG. 12 is illustrative of a BG directory list according to a second embodiment of the present invention.

In this embodiment, information relating to this directory is provided from the printer driver (GDI 14) as a background (BG) directory list as shown in FIG. 12. FIG. 12 shows that a background file for application A, for example, is stored in a directory: C:\ProgramFile\ApliA\Background.

For that reason, in this embodiment, these directories are seen one-by-one in sequence and, if a file that matches the bitmap data extracted in S610 is found, it is determined that the bitmap object is a background object.

A positive determination is made in S620 (S620:YES) until all of the BG directories have been seen, and the process proceeds to S630 in which another still-unseen BG directory is extracted. In S640, it is determined whether or not there is a still-unseen file stored in the thus-extracted directory. A positive determination is made in S640 (S640:YES) until all of the BG files have been seen, and the process proceeds to S650 in which another still-unseen BG file is extracted.

In S660, it is determined whether or not the background file extracted in S650 is in bitmap format. If the background file is in bitmap format (S660:YES), then the process directly proceeds to S680. On the other hand, if the background file is not in bitmap format (S660:NO), then the background file is converted into bitmap format in S670, and the process proceeds to S680.

In other words, the background files stored in the BG directories are not necessarily all in bitmap format. The background files could be in formats other than bitmaps, such as PNG or JPG. Converting the background file that is not in the bitmap format into bitmap format enables to compare the background file with the bitmap data in the same format in a subsequent comparison process of S680.

In S680, the extracted background file is compared with the bitmap data, and it is determined in S690 whether or not they match based on the result of the comparison. More specifically, first the total sizes of the extracted background file and the bitmap data are compared, and it is determined that these two do not match if the sizes are different. If the sizes are the same, then a simple comparison of each data string is performed to determine whether or not the data strings match completely. If the data strings completely match, then a positive determination is made in S690 (S690:YES), and the process proceeds to S695. In S695, it is determined that the bitmap data is data representing a background object.

If a negative determination is made in S690 (S690:NO), then the process returns to S640 to perform the same process (comparison process) on another background file. If none of all the background files of the current directory matches the bitmap data, a negative determination is made in S640 (S640: NO), and the process proceeds to S620. If it is determined in S620 that there is other unseen BG directory (S620:YES), then the process proceeds to S630.

In this manner, the comparison is done between the background files stored in the directories and the bitmap data (extracted in S610) for all the directories listed in the BG directory list, provided the comparison processing of S680 does not determine there is a match. If they are all determined to not match, a negative determination is made in S620 (S320: NO), and the process proceeds to S700 where it is determined that the bitmap data is not background data.

As described above, in this embodiment, a bitmap object is determined to be a background object if bitmap data of the bitmap object matches one of background files that is stored in predetermined directories provided for each application, that, a background file of each application. Therefore, it possible to determine reliably whether or not it is a background object.

Third Embodiment

In the above-described embodiments, if it is determined that a bitmap object is a background object while the printer driver (the GDI 14) is converting the spool file into PDL codes, then a watermark is drawn again after a background object has been drawn. In this third embodiment, however, a spool file is retrieved from the spool area 28 and processed to ensure that a watermark is re-drawn after a background object has been drawn. Then, the processed spool file is again spooled into the spool area 28. The printer driver generates PDL codes on the basis of the spool file that has been processed and spooled in the spool area 2B. Details will be described below.

Figure 14:
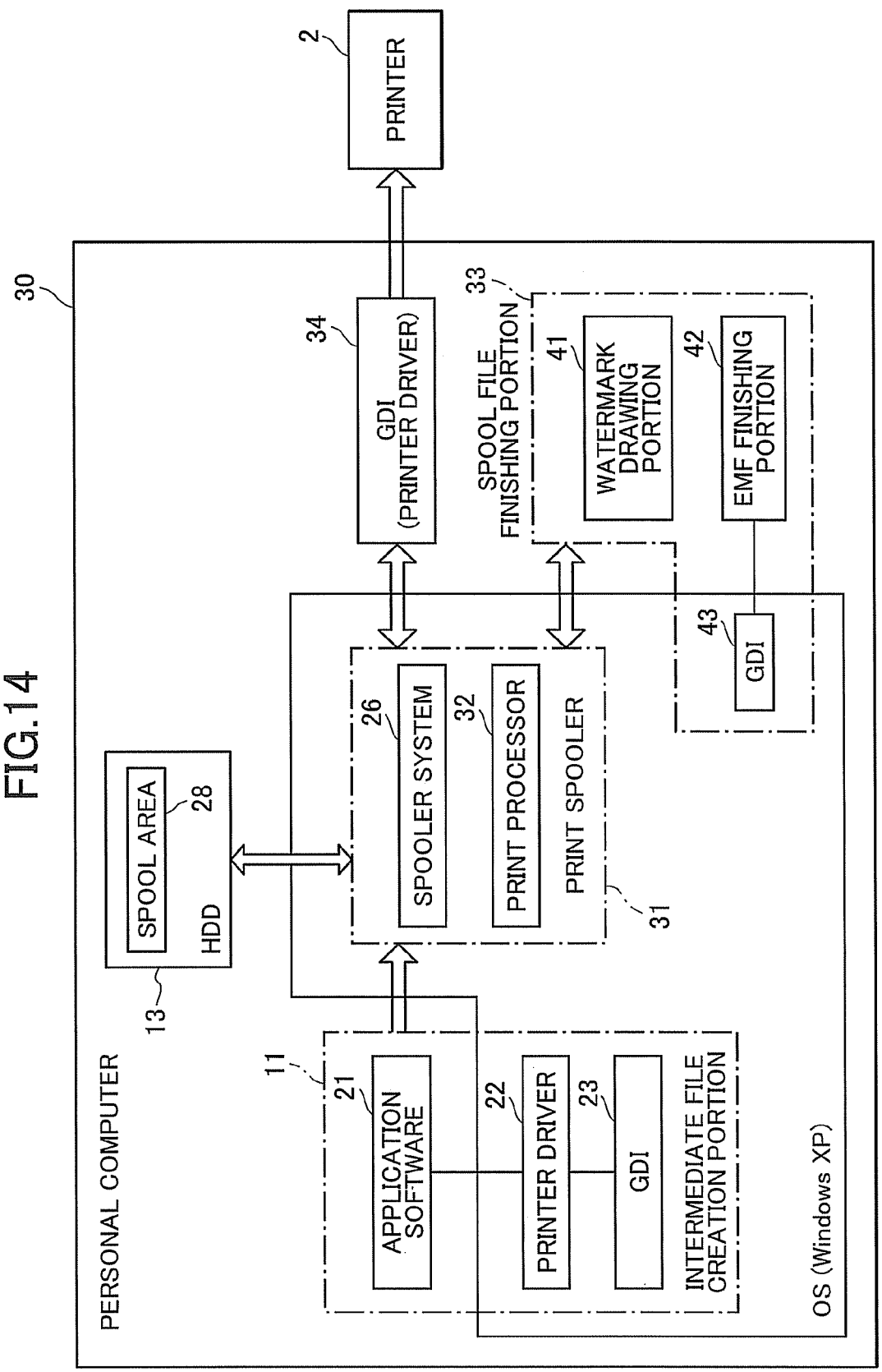
FIG. 14 is a block diagram of a software module configuration of a drawing processing system according to a third embodiment of the present invention.

FIG. 14 is a block diagram of a software module configuration of a drawing processing system according to the third embodiment. The main difference in comparison with FIG. 1 is that it is provided with a spool processing portion 33 for processing a spool file, and also that a printer driver (GDI 34) does the conversion into PDL codes of a spool file as is, after the spool file has been processed by the spool processing portion 33. Structural components that are the same as those of FIG. 1 are therefore denoted by the same reference numbers and further description thereof is omitted. The description below concentrates on the differences with respect to FIG. 1.

A print processor 32 fetches a spool file that has been spooled into the spool area 28 by the spooler system 26, and determines whether or not the spool file has processing information (FIG. 4). If the spool file has processing information, then the spool file is passed to the spool processing portion 33.

The spool processing portion 33 divides the spool file passed by the print processor 32 into EMFs for each page, then copies the EMFs of each page to a temporary file on the HDD 13. This temporary file is deleted as soon as it is no longer necessary. Note that before the page division, processing information is obtained from the spool file to identify what type of process (how to attach a watermark, in this embodiment) has been specified beforehand. An EMF processing portion 42 then processes the EMF while cooperating with a watermark drawing portion 41 and a GDI 43 that is one function of the OS.

Of these components, the watermark drawing portion 41 is for performing a drawing process for a watermark during the process. In other words, if the watermark drawing process becomes necessary while the EMF processing portion 42 is processing the EMFs, the watermark drawing portion 41 draws the watermark.

A new spool file obtained by the process performed by the spool processing portion 33 in this manner (an EMF for each page) is sent to the printer driver (GDI 34) by the print spooler 32, and the new EMFs are converted into PDL codes corresponding to the printer 2 by the printer driver (GDI 34) and sent to the printer 2.

Figure 15:
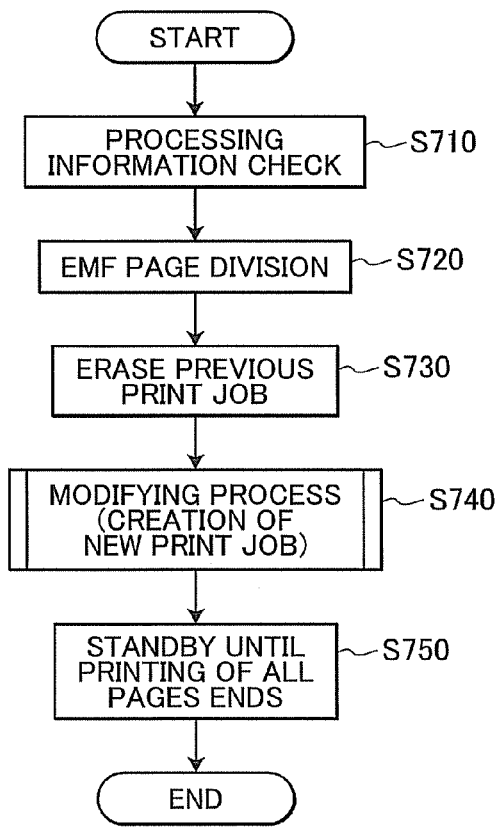
FIG. 15 is a flowchart representing a spool file modifying process according to the third embodiment of the present invention.

The description now turns to a spool file modifying process executed by the spool processing portion 33, with reference to FIG. 15. FIG. 15 is a flowchart representing the spool file modifying process of this embodiment. A program for implementing the functions of the spool processing portion 33 is run on a PC 30.

When the spool file modifying process starts, first in S710, it is identified what process is to be performed based on processing information within the spool file. In S720, the spool file is divided into the EMFs for individual pages, and in S730, the print job (spool file) is erased from the spool area 28. Then, the process proceeds to S740.

In S740, a modifying process is performed with respect to the EMFs for each page in accordance with the processing information that was checked in S710 so as to create a new (processed) spool file for a newly created job. The processed spool file is spooled into the spool area 28. Then, the process waits until the newly created print job has completed printing for all pages (S750), and the processing ends temporarily together with the end of the printing.

Figure 16:
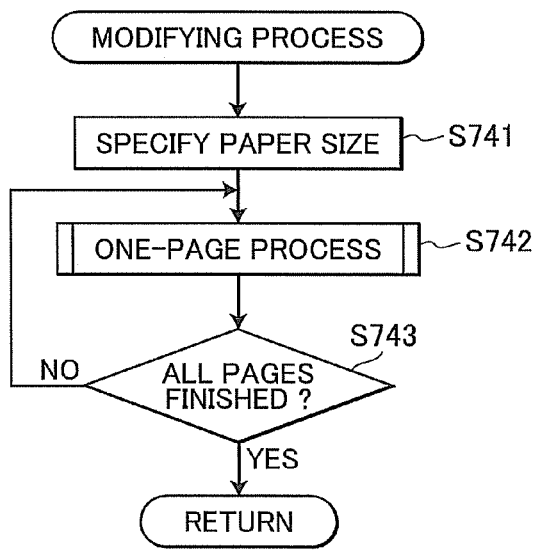
FIG. 16 is a flowchart representing a modifying process that is performed in S740 of the spool file modifying process of FIG. 15.

The description now turns to details of the modifying process of S740 with reference to FIG. 16. As shown in FIG. 16, first in S741, the paper size is specified based on page size information (information indicating the paper size for the actual printout by the printer 2) within the processing information. Alternatively, the paper size could be specified based upon paper size information that is obtained by calling an API of the OS.

Then, in S742, a one-page process is performed in accordance with the specified paper size. If the one-page process has completed for all of pages of EMFs (S743:YES), then the process ends.

Figure 17:
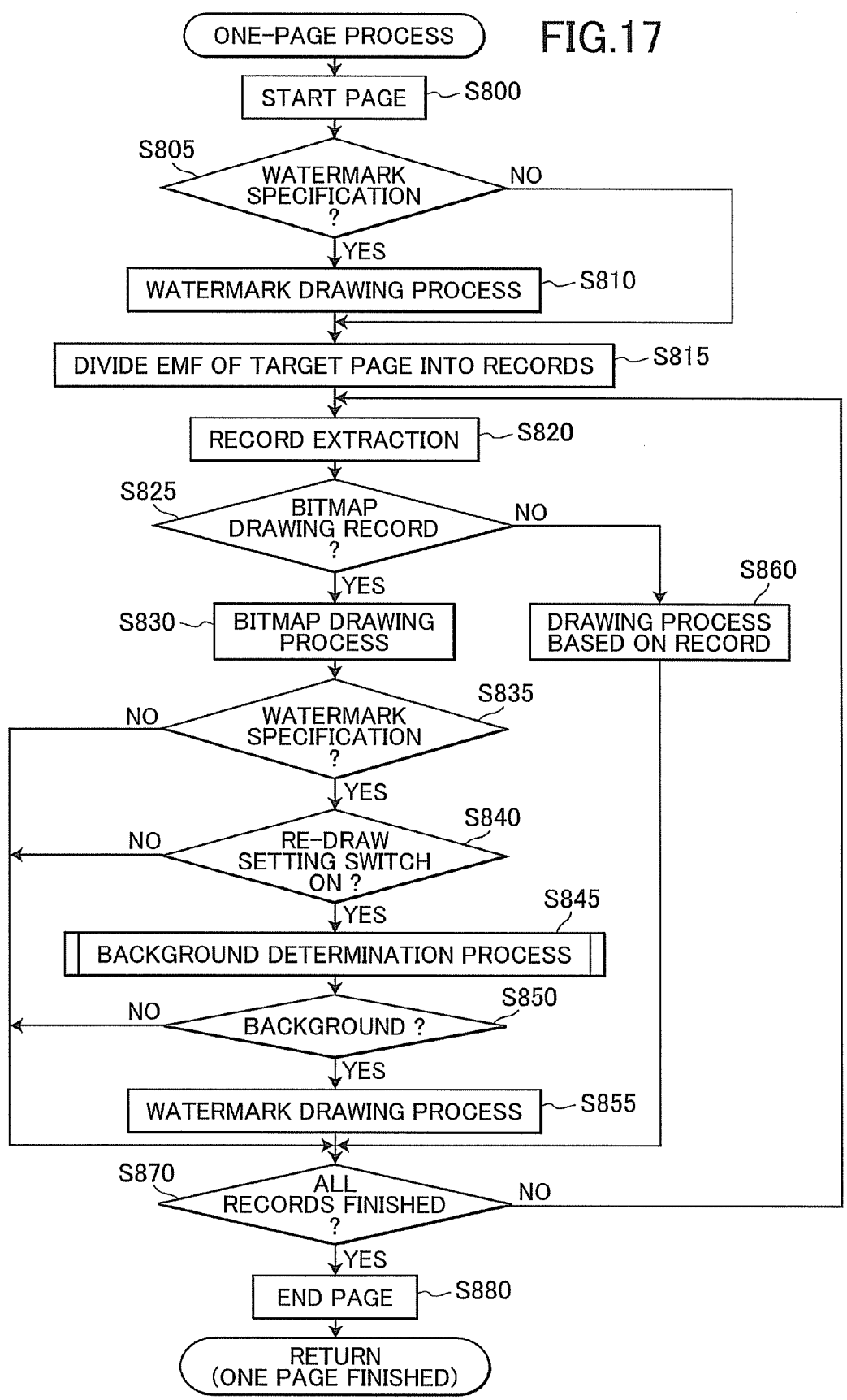
FIG. 17 is a flowchart representing a one-page process that is performed in S742 of the modifying process of FIG. 16.

The description now turns to the one-page process performed in S742. FIG. 17 is a flowchart representing the one-page process. As shown in FIG. 17, first in S800, a page header declaration is done with respect to the device context (DC), by calling the API Start Page. Then, it is determined in S805 whether or not attachment of a watermark has been specified based on processing information within the spool file. In this example, processing information such as that shown in FIG. 4 is attached as watermark attachment information. For that reason, a positive determination is made in S805 (S805:YES), then the process proceeds to S810. In S810, drawing process is performed on the DC of the specified watermark.

In S815, the EMF of the target page is divided into records, and in S820, one of the records is extracted. In S825, it is determined whether or not the extracted record is a bitmap drawing record corresponding to a bitmap object. If the record is not a bitmap drawing record (S825:NO), then the process proceeds to S860, and drawing process to the DC is performed based on the record. Then, the process proceeds to S870. On the other hand, if the recording is a bitmap drawing record (S825:YES), then the process proceeds to S830, and drawing process to the DC is performed based on the bitmap drawing record.

In S835, it is determined whether or not attachment of a watermark has been specified in the same manner as in S805. If attachment of a watermark has not been specified (S835: NO), then the process proceeds to S870. On the other hand, if attachment of a watermark has been specified (S835:YES), then the process proceeds to S840 in which it is determined whether or not the watermark re-draw setting switch has been set to "ON" in the same manner as in S345 of FIG. 9. That is, if the "Print watermark in front of background" checkbox 63 of the print setting screen shown in FIG. 5 has been checked, then the re-draw setting switch is at "ON" (S840:YES), and the process proceeds to S845. If the "Print watermark in front of background" checkbox 63 has not been checked, then the re-draw setting switch is "OFF" (S840:NO), and the process proceeds to S970.

In S845, a background determination process is performed to determine whether or not a bitmap object corresponding to the bitmap drawing record that has been drawn to the DC in S830 is a background object representing a background. Since this background determination process is exactly the same as that described previously with reference to FIGS. 10 and 11, further description thereof is omitted.

In S850, it is determined whether or not the bitmap object is a background object, based on the determination result of S845. If not (S850:NO), then the process proceeds to S870. If so (S850:YES), then the drawing of the watermark to the DC is performed again in S855. This watermark drawing process is exactly the same as that of S810.

In S870, it is determined whether or not all of the records that were separated in S815 have been subjected to the process from S820 onward. If the process of all of the records has ended (S870:YES), then the process proceeds to S880, and the API End Page is called. In other words, the DC is closed at this point and an indication that the processing of one page has ended is sent to the spooler system 26.

As a result, the processed EMF of the page is spooled into the spool area 28 and output to the printer 2 when the operating state of the printer 2 permits.

The new EMF that has been processed in the above-described manner always includes a record corresponding to a watermark attached after a record corresponding to a background object, provided the "Print watermark in front of background" checkbox 63 of the print setting screen shown in FIG. 5 has been checked. For that reason, the printer driver (GDI 34) can obtain raster data in which the watermark is drawn over the background object, by simply rasterizing the EMF without further changes in the record arrangement sequence, during the process of converting the processed EMF into PDL codes.

Fourth Embodiment

In the fourth embodiment, a basic software module configuration is the same as that of FIG. 1 (the first embodiment). However, when a background object is being converted into a record during the generation of the EMF by the application software 21, a comment record is attached in front of the record. Then, it is determined whether or not the record is a background object based on the presence or absence of the comment record during the conversion into PDL codes by the printer driver. In this manner, determination as to whether an object is a background object is made in a further reliable manner.

In other words, during the bitmap object drawing process of S260 FIG. 8, if a bitmap object is determined to be a background object, then a comment record is attached. The comment record is a background announcement comment indicating that the next bitmap object to be drawn is a background object. When the background announcement comment is fetched during the conversion into PDL codes based on these records, the next bitmap object to be fetched is assumed to be a background object.

The description now turns to an application-side drawing process by the application software 21 and a PDL conversion process by the printer driver (GDI 14) of this embodiment. The application-side drawing process is described first with reference to FIG. 18.

Figure 18:
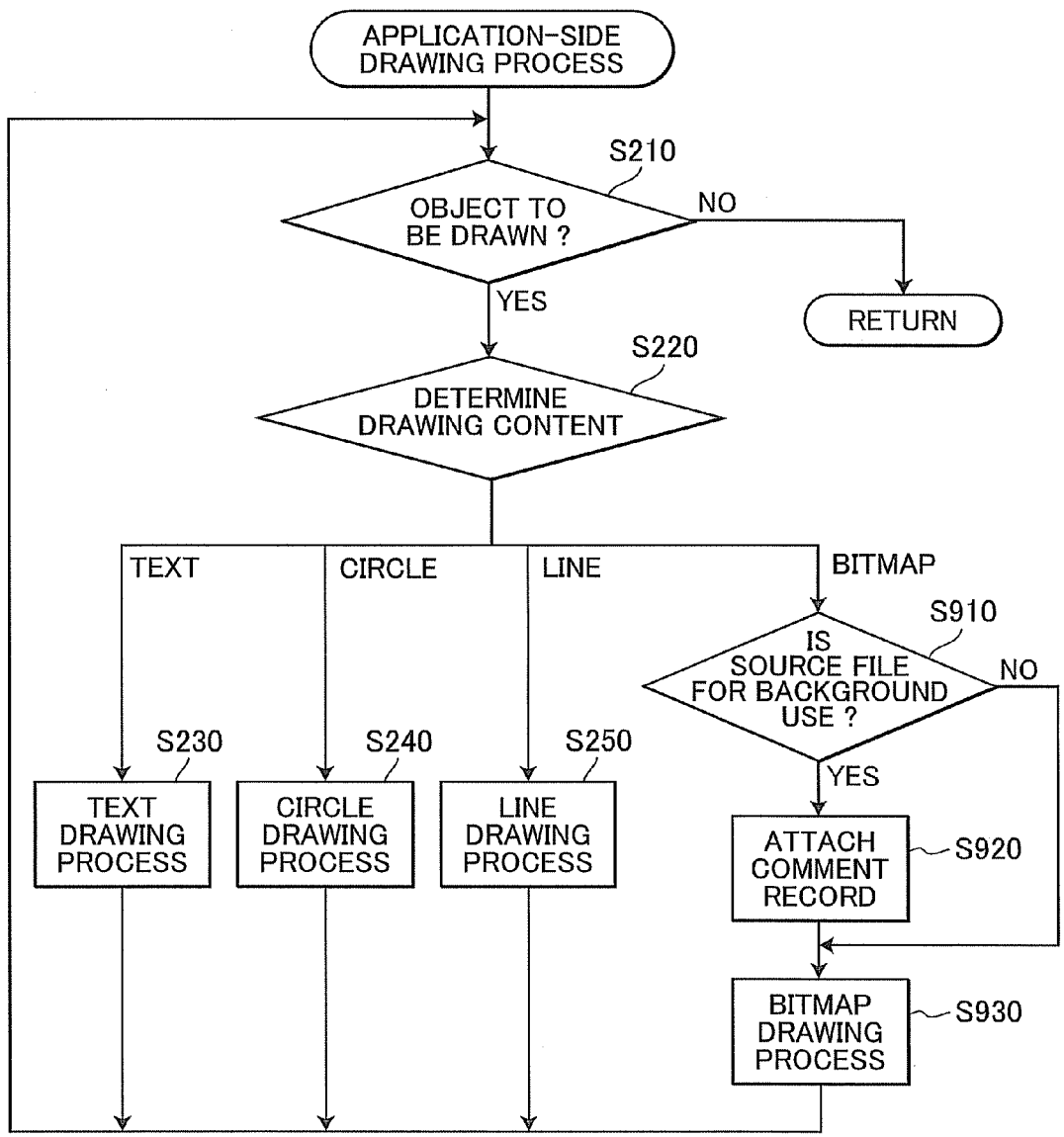
FIG. 18 is a flowchart representing an application-side drawing process according to a fourth embodiment of the present invention.

The application-side drawing process of FIG. 18 is similar to that of FIG. 8 except for a difference in a process performed if a next drawing object is determined in S220 to be a bitmap drawing object. Therefore, further mention of the processing of S210 to S250 is omitted and the description relates to S910 onward.

If it is determined in S220 that the next drawing object is a bitmap object, it is determined in S910 whether or not a source file is for a background (in other words, whether or not the bitmap object is a background object). Note that the application software 21 itself can naturally check whether or not the source file is for a background. If the source file is not for a background (S910:NO), then the process proceeds to S930.

Figure 19:
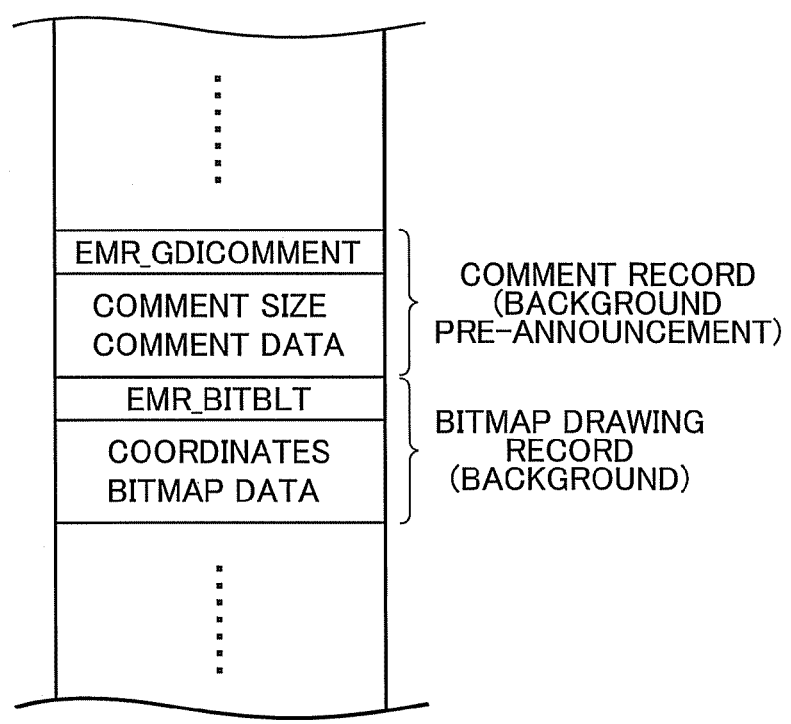
FIG. 19 is illustrative of the relationship between a comment record and a bitmap drawing record according to the fourth embodiment of the present invention.

If the source file is for a background (S910:YES), then the process proceeds to S920 where a comment record is attached as the background announcement comment, and the process proceeds to S930. In S930, a drawing process is performed for the bitmap object. In this manner, a background announcement comment is attached as a comment record before the bitmap drawing record as shown in FIG. 19.

Figure 20:
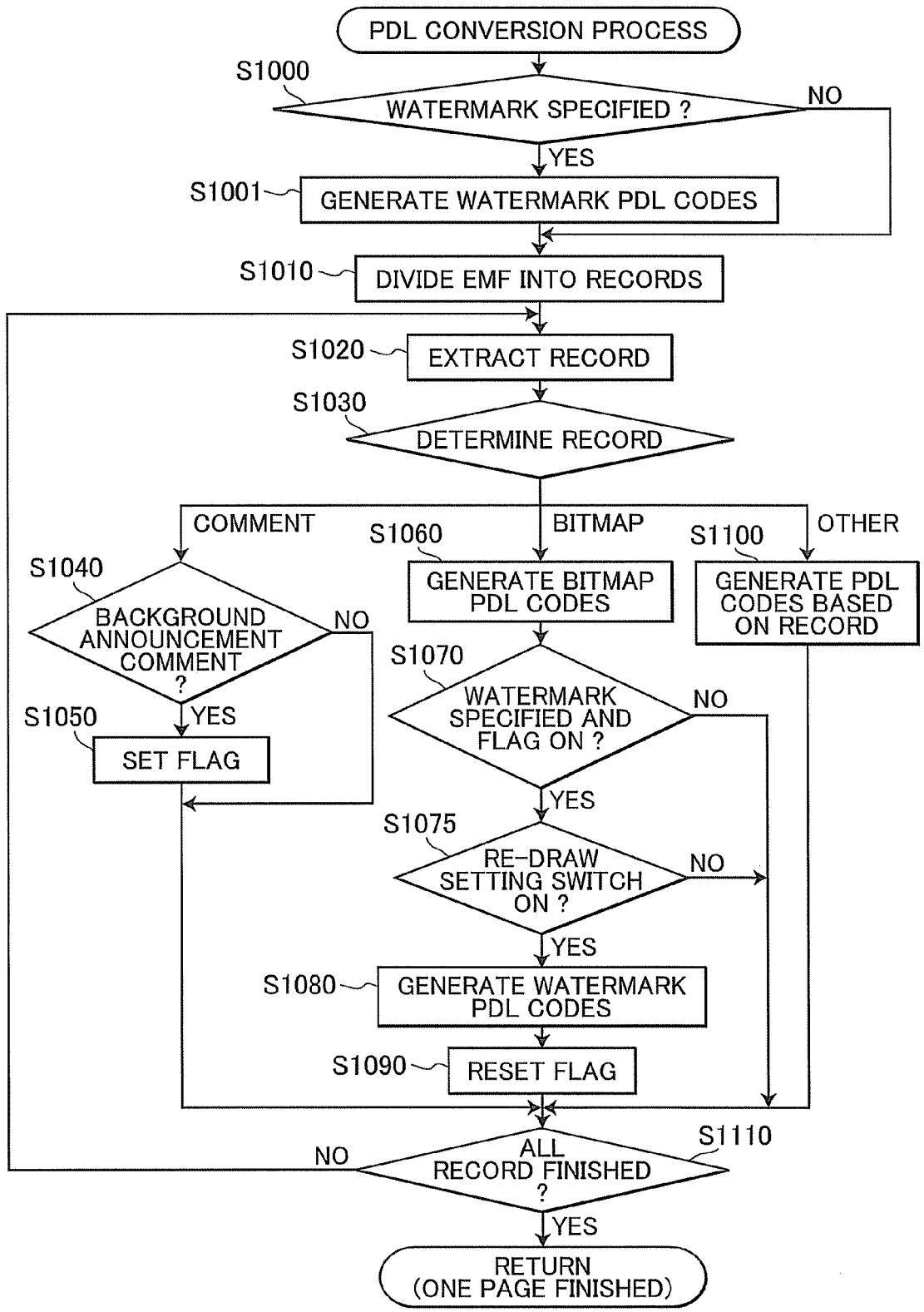
FIG. 20 is a flowchart representing a PDL conversion process according to the fourth embodiment of the present invention.
Figure 21A:
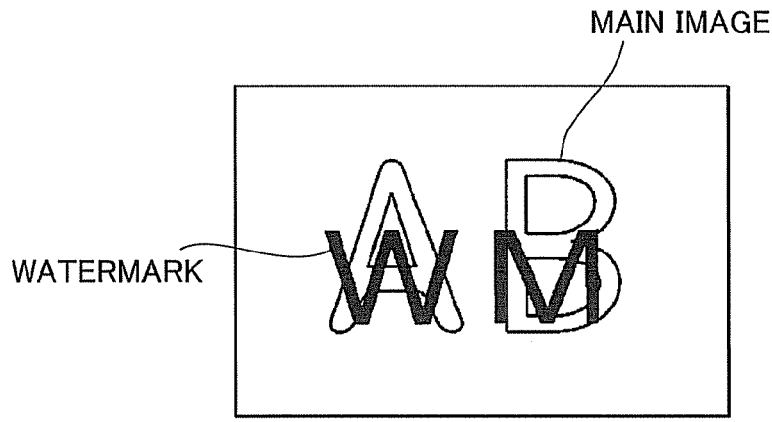
FIG. 21($a$) is illustrative of the results of printing a watermark attached to a main image by forward attachment.
FIG. 21(c) is illustrative of the results of printing a watermark attached to a main image by rearward attachment in which the watermark is hidden behind a background of the image images.
Figure 21B:
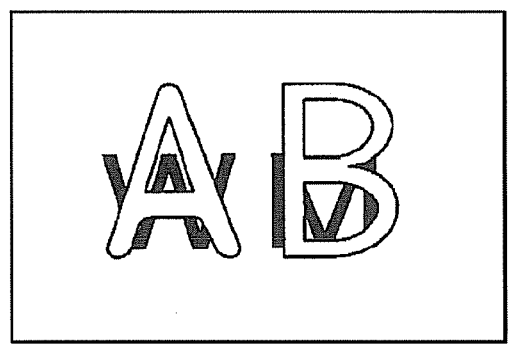
Figure 21C:
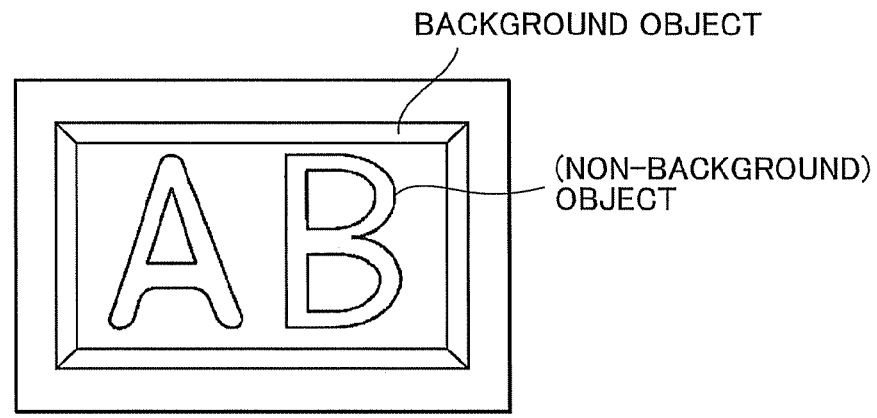

The description now turns to the PDL conversion process with reference to FIG. 20. The PDL conversion process of FIG. 20 is performed by running a program for implementing the functions of the printer driver (GDI 14) on the PC 1.

When the PDL conversion process starts, first in S1000, it is determined whether or not attachment of a watermark has been specified in the same manner as in S310 of FIG. 9. If not (S1000:NO), then the process proceeds to S1010. If so (S1000:YES), then in S1001, watermark PDL codes are generated, and the process proceeds to S1010. In S1010, the EMF corresponding to the target page is divided into records. In S1020, one of the records is extracted. In S1030, the contents of the record extracted in S1020 is determined. In this embodiment, it is determined whether the record belongs to comment record, bitmap drawing record, or other record.

If the record is a comment record, then the process proceeds to S1040, and it is determined whether or not the comment record is a background announcement comment attached in the process of S920 in the application-side drawing process of FIG. 18. If the comment record is not the background announcement comment (S1040:NO), then the process proceeds to S1110. On the other hand, if the comment record is the background announcement comment (S1040:YES), then a flag is set in S1050, and the process proceeds to S1100. This flag indicates that the next record is a background object drawing record.

If the record extracted in S1020 is a bitmap drawing record, then the process proceeds to S1060, and the record is converted into PDL codes. In S1070, it is determined whether attachment of a watermark has been specified and also the flag is set. Here, it is determined that attachment of a watermark has been specified if the user had checked the "Use watermark" checkbox 61 on the print setting screen of FIG. 5. The flag is the one that is set is S1050.

If a negative determination is made in S1070 (S1070:NO), then the process proceeds to S1110. If a positive determination is made in S1070, then this means that the bitmap drawing record that has just converted into PDL codes in S1060 corresponds to a background object. This also means that the process in S1060 has substantially invalidated the PDL code conversion for the watermark that was previously performed in S1001.

In S1075, it is determined whether or not a watermark re-draw switch has been set to ON in the same manner as in S345. If so (S1075:YES), then the conversion of the watermark into FDL codes is again performed in S1080. The flag is then reset in S1090, and the process proceeds to S1110. On the other hand, if not (S1075:NO), then the process proceeds to S1100.

If the record extracted in S1020 is neither a comment record nor a bitmap drawing record, then the process proceeds to S1100, where PDL conversion is performed based on the record. Then, the process proceeds to S1110. In S1110, it is determined whether or not all of the records have been extracted and subjected to the process from S1030 onward. The process from S1020 onward is repeated until all of the records have been processed, that is, until a positive determination is made in S1110.

As described above, according to the fourth embodiment, a comment record is attached by the application software 21 in front of a record that corresponds to a background object, and a watermark is again converted into PDL codes if the printer driver encounters the comment record during the conversion into PDL codes. Therefore, it is possible to determine whether or not a bitmap object is a background object in a more reliable manner.

According to the above-described embodiments, a watermark is drawn first irrespective of the presence of a background object, so that the watermark can be drawn reliably even if there is no background object.

A watermark could be created from text data as described previously, and a watermark created from text data could be displayed (drawn) without being hidden by a background object, even if the background object is drawing on top of the text data, depending on the configuration of the drawing processing system that draws the watermark (such as the type of operating system (OS) provided for the computer that configures the drawing processing system). However, even if text data would not be hidden by the background object as described above, a watermark in bitmap format would inevitably be hidden by the background object. According to the above-described embodiments, a watermark in bitmap format can be drawn reliably on top of the background object.

While some exemplary embodiments of this invention have been described in detail, those skilled in the art will recognize that there are many possible modifications and variations which may be made in these exemplary embodiments while yet retaining many of the novel features and advantages of the invention.

For example, in the PDL conversion process of FIG. 9 for the above-described first embodiment, the determination (FIG. 10) as to whether or not the size of the bitmap object is substantially the same as the physical size of the printing paper 50 (at least 80% of the surface area of the paper) and the determination (FIG. 11) as to whether or not the overlapping portion of the bitmap object and the watermark is white or a pale color were given as specific examples of the background determination of 3350. However, these methods are simply examples and thus it is also possible to determine that a bitmap object is a background object if it satisfies both of these two (size and color), or if the bitmap object completely covers the watermark.

In addition, the determination standard for the background determination process of FIG. 10 of "at least 80% of the surface area of the paper" is nothing more than an example and thus the proportion with respect to the surface area of the paper could be higher (or lower), or the determination could be based on a distance from an edge of the paper to the bitmap object. For example, it could be determined that a bitmap object is a background object if the distance from each of the four edges of the paper to the bitmap object is within a predetermined distance.

Furthermore, in the PDL conversion process of FIG. 9 for the above-described first embodiment, the re-draw setting switch determination of S345 is based on an instruction from the exterior, in other words, it is determined if the "Print watermark in front of background" checkbox 63 of the print setting screen (FIG. 5) is ON. However, this determination could be based on whether or not the application software 21 is presentation software, for example. In other words, if a job was created by presentation software, then a re-draw setting switch is turned ON, whereas if the job was created by software other than presentation software, then the re-draw setting switch is turned OFF. That is, the phenomenon by which a watermark is hidden by a background object contrary to the user's wishes does not happen in the same way in all applications, but it could easily happen if a background object has been set as default, such as in presentation software, as mentioned previously. Therefore, by determining whether or not the job was created by presentation software, it is possible to avoid wasteful process, such as that of determining whether or not there is a background object in application software in which there is a low probability of the above problem occurring due to a background object (such as wordprocessor software that creates documents of text alone), enabling a reduction in the processing load on the overall drawing processing system. Note that the determination of whether or not it is presentation software could be based on the document name attached to the tooter of the spool file.

Still further, in each of the above-described embodiments, the spool file was converted into PDL codes and output to the printer 2 by the printer driver, but it would also be possible to not use PDL codes and output the raster data (bitmap data) to the printer 2.

Even further, in the background determination process of FIG. 11 for the above-described first embodiment, a bitmap object is determined to be a background object if an overlapping region of a watermark and the bitmap object is completely white or a pale color, but it is not always necessary to specify "completely" and thus it is possible to determine that the bitmap object is a background object if the overlapping region has white or pale-colored portions.

In the above-described embodiments, the present invention was implemented by a one-pass method in which, during the drawing process for the objects (during the PDL code generation for each object by the printer driver in the first, second, or fourth embodiments, or the spool file process in the third embodiment), the determination as to whether or not an object that is to be drawn is a background object and a processing to re-draw a watermark after drawing the background object are both performed for each object. However, the present invention could be implemented by a two-pass method in which the determination as to whether or not an object is a background object and the actual drawing process could be separated.

Specifically, the determination as to whether or not an object is a background object could be performed first for all objects in an EMF, and an object in the EMF that has been recognized as a background object is stored. Then, the drawing process for the objects starts and, if an object to be drawn is found to be the object that was stored as described above, a watermark is re-drawn after the drawing process of the object.

The present invention can be implemented by either a one-pass method or a two-pass method, but since the one-pass method makes it possible to perform the background determination and the watermark drawing simultaneously with the execution of the object drawing processing, one-path method makes it possible to obtain the one-page image with attached watermark within a shorter time than the two-pass method.

The embodiments were described above as examples of the implementation of the additional image drawing system of the present invention as one device (a personal computer), but the present invention can be implemented by a plurality of devices. In the third embodiment, for example, the processes up until the process of the spool file could be performed by the PC 30, and the spool file could be sent to the printer 2 after that. Then, the conversion of the spool file into PDL codes (rasterization) could be performed by the printer side.

In addition, the description of the embodiments above related to a configuration in which various programs for implementing the functions of the drawing processing system were all stored in the HDD 13, but these programs could equally well be stored on various other storage devices, such as floppy disk (tradename), magneto-optical is disk, CD-ROM, or hard disk (recording medium that can be read by a computer).

In such a case, the drawing processing system can be implemented on a computer system as required by loading the programs stored on the recording medium into the computer system and running them as necessary.

Also, the above programs could be stored in ROM or backup RAM as recording media that can be read by a computer, and the ROM or RAM could be incorporated in the computer system. The programs could also be installed in a computer through a communications circuit.

What is claimed is:

1. An attaching method of attaching an additional image to a one-page image that is obtained by drawing one or more objects including at least one bitmap object in bitmap format in a predetermined sequence, the attaching method comprising:
   a) determining, with a drawing processing device, whether or not an object that is to be drawn is a bitmap object;
   b) if the object is determined to be a bitmap object in the step a), determining whether or not the object is a background object representing a background of the one-page image; and
   c) if the object is determined to be a background object in the step b), drawing an additional image after drawing the background object.

2. The attaching method according to claim 1, wherein:
   the determination in the step a) is performed while drawing the one or more objects to obtain the one-page image;
   the determination in the step b) as to whether or not an object is a background object is performed every time the object was determined to be a bitmap object in the step a); and
   if the object is determined to be a background object in the step b), an additional image is drawn after the background object is drawn in the step c) but before another object that is to be drawn after the background object has been drawn.

3. The attaching method according to claim 1, further comprising d) drawing the additional image before drawing any other object but the background object.

4. The attaching method according to claim 1, wherein the object is determined to be a background object in the step b) if the size of the object is substantially the same as the size of a recording medium on which the one-page image is printed out.

5. The attaching method according to claim 1, wherein the object is determined to be a background object in the step b) if a drawing region of the object and a drawing region of the additional image overlap and if a portion of the drawing region of the object that overlaps the drawing region of the additional image is white or a pale color.

6. The attaching method according to claim 1, wherein the object is determined to be a background object in the step b) if the object matches a registered background object.

7. The attaching method according to claim 1, wherein the object is determined to be a background object in the step b) if a background identification information is associated with the object, the background identification information denoting that the object is a background object.

8. The attaching method according to claim 1, further comprising e) determining whether or not a re-draw setting has been made by a user, wherein the additional image is drawn in the step c) only if it is determined in the step e) that the re-draw setting has been made.

9. The attaching method according to claim 1, wherein the additional image is a watermark.

10. A drawing processing system comprising:
   storing means for storing a recode file for one-page image, the record file including object records each representing an object;
   record fetching means for fetching the object records one-by-one in a predetermined sequence from the record file;
   object drawing means for analyzing the object record fetched by the record fetching means and for drawing an object of the object record;
   determination means for determining whether or not an object corresponding to the object record fetched by the record fetching means is a background object in a bitmap format, the background object representing a background; and
   additional image drawing means for drawing an additional image;
   wherein if the determination means has determined that the object is a background object, the additional image drawing means draws the additional image after the object drawing means has drawn the object that was determined to be the background object.

11. The drawing processing system according to claim 10, wherein the additional image drawing means draws the additional image after the object drawing means has drawn the object but before the object drawing means draws another object that is to be drawn after the object has been drawn.

12. The drawing processing system according to claim 10, wherein the additional image drawing means draws the additional image before the object drawing means draws any object.

13. The drawing processing system according to claim 10, wherein the determination means includes:
   a first determination means for determining whether or not the object is a bitmap object in a bitmap format;
   a second determination means for determining, if the object has been determined to be a bitmap object by the first determination means, whether or not the bitmap object represents a background; and
   a third determination means for determining that the object is a background object if the bitmap object has been determined to represent a background by the second determination means.

14. The drawing processing system according to claim 13, wherein the second determination means determines that the bitmap object represents a background if the size of the bitmap object is substantially the same as the size of a recording medium onto which the one-page image is printed out.

15. The drawing processing system according to claim 13, wherein the second determination means determines that the bitmap object represents a background if a drawing region of the bitmap object overlaps a drawing region of the additional image and if a portion of the drawing region of the bitmap object that overlaps the drawing region of the additional image is white or a pale color.

16. The drawing processing system according to claim 15, wherein the second determination means determines that the bitmap object represents a background if the entirety of the portion of the bitmap object that overlaps the drawing region of the additional image is white or a pale color.

17. The drawing processing system according to claim 13, further comprising:
   object generating means for, by application software, generating one or more objects for the one-page image;
   record file generating means for generating a record file including one or more object records corresponding to the respective one or more objects; and
   background object storage means for storing background data representing a background object provided by the application software;
   wherein
   the determination means determines that the bitmap object represents a background if the bitmap object matches the background object corresponding to the background data stored in the background object storage means.

18. The drawing processing system according to claim 10, further comprising:
   generating means for, by application software, generating one or more objects for the one-page image;
   record file generating means for generating a record file including one or more object records corresponding to the respective one or more objects, the record file further including a background identification information located in front of an object record representing a background object, the background identification information indicating that a corresponding object is a background object; and
   the determination means determines that the object is a background object if the background identification information is attached to the object record that has been fetched by the record fetching means.

19. The drawing processing system according to claim 10, further comprising:
   record file processing means for generating a processed record file from the one-page image that includes the object records drawn by the object drawing means and the additional image drawn by the additional image drawing means by sequentially converting objects included in the one-page image and an object of the additional image into the object records in the predetermined sequence;
   conversion means for converting the object records of the processed record file into one of page description language data and raster data in the predetermined sequence.

20. The drawing processing system according to claim 10, wherein:
   the object drawing means draws an object by converting a corresponding object record fetched by the record fetching means into one of page description language and raster data; and
   the additional image drawing means draws the additional image by converting the additional image into one of page description language and raster data.

21. The drawing processing system according to claim 10, further comprising:
   generating means for, by application software, generating one or more objects for the one-page image; and
   record file generating means for generating a record file including one or more object records corresponding to the respective one or more objects, the record file further including a background identification information located in front of an object record representing a background object, the background identification information indicating that a corresponding object is a background object;

wherein the determination means determines whether or not the object is a background object and the additional image drawing means draws the additional image after the background object has been drawn only if the application software is a presentation software.

22. The drawing processing system according to claim 19, wherein the determination means determines whether or not the object is a background object and the additional image drawing means draws the additional image after the background object has been drawn only if specified from an exterior.

23. The drawing processing system according to claim 10, wherein the additional image is in bitmap format.

24. The drawing processing system according to claim 10, wherein the additional image is a watermark.

25. A computer-readable storage medium storing a computer-executable program for attaching an additional image to a one-page image that is obtained by drawing one or more objects including at least one bitmap object in bitmap format in a predetermined sequence, the program comprising:
   a) instructions for determining whether or not an object that is to be drawn is a bitmap object;
   b) instructions for if the object is determined to be a bitmap object, determining whether or not the object is a background object representing a background of the one-page image; and
   c) instructions for, if the object is determined to be a background object, drawing an additional image after drawing the background object.

26. The computer-readable storage medium according to claim 25, wherein:
   the determination by the instructions a) is performed while drawing the one or more objects to obtain the one-page image;
   the determination by the instructions b) as to whether or not an object is a background object is performed every time the object was determined to be a bitmap object by the instructions a); and
   if the object is determined to be a background object by the instructions b), an additional image is drawn after the background object is drawn by the instructions c) but before another object that is to be drawn after the background object has been drawn.

27. The computer-readable storage medium according to claim 25, wherein the program further comprises d) instructions for drawing the additional image before any other object but the background object has been drawn.

28. The computer-readable storage medium according to claim 25, wherein the object is determined to be a background object by the instructions b) if the size of the object is substantially the same as the size of a recording medium on which the one-page image is printed out.

29. The computer-readable storage medium according to claim 25, wherein the object is determined to be a background object by the instructions b) if a drawing region of the object and a drawing region of the additional image overlap and if a portion of the drawing region of the object that overlaps the drawing region of the additional image is white or a pale color.

30. The computer-readable storage medium according to claim 25, wherein the object is determined to be a background object by the instructions b) if the object matches a registered background object.

31. The computer-readable storage medium according to claim 25, wherein the object is determined to be a background object by the instructions b) if a background identification information is associated with the object, the background identification information denoting that the object is a background object.

32. The computer-readable storage medium according to claim 25, wherein the program further comprises e) instructions for determining whether or not a re-draw setting has been made by a user, wherein the additional image is drawn by the instructions c) only if it is determined by the instructions e) that the re-draw setting has been made.

33. The computer-readable storage medium according to claim 25, wherein the additional image is a water mark.

34. A drawing processing device comprising:
   storing means for storing a recode file for one-page image, the record file including object records each representing an object;
   record fetching means for fetching the object records one-by-one in a predetermined sequence from the record file;
   object drawing means for analyzing the object record fetched by the record fetching means and for drawing an object of the object record;
   determination means for determining whether or not an object corresponding to the object record fetched by the record fetching means is a background object in a bitmap format, the background object representing a background; and
   additional image drawing means for drawing an additional image;
   wherein
   if the determination means has determined that the object is a background object, the additional image drawing means draws the additional image after the object drawing means has drawn the object that was determined to be the background object.

35. The drawing processing device according to claim 34, wherein the additional image drawing means draws the additional image after the object drawing means has drawn the object but before the object drawing means draws another object that is to be drawn after the object has been drawn.

36. The drawing processing device according to claim 34, wherein the additional image drawing means draws the additional image before the object drawing means draws any object.

37. The drawing processing device according to claim 34, wherein:
   the determination means includes a first determination means for determining whether or not the object is a bitmap object in a bitmap format;
   a second determination means for determining, if the object has been determined to be a bitmap object by the first determination means, whether or not the bitmap object represents a background; and
   a third determination means for determining that the object is a background object if the bitmap object has been determined to represent a background by the second determination means.

38. The drawing processing device according to claim 37, wherein the second determination means determines that the bitmap object represents a background if the size of the bitmap object is substantially the same as the size of a recording medium onto which the one-page image is printed out.

39. The drawing processing device according to claim 37, wherein the second determination means determines that the bitmap object represents a background if a drawing region of the bitmap object overlaps a drawing region of the additional image and if a portion of the drawing region of the bitmap object that overlaps the drawing region of the additional image is white or a pale color.

40. The drawing processing device according to claim 39, wherein the second determination means determines that the bitmap object represents a background if the entirety of the portion of the bitmap object that overlaps the drawing region of the additional image is white or a pale color.

41. The drawing processing device according to claim 37, further comprising:
    object generating means for, by application software, generating one or more objects for the one-page image;
    record file generating means for generating a record file including one or more object records corresponding to the respective one or more objects; and
    background object storage means for storing background data representing a background object provided by the application software;
wherein
the second determination means determines that the bitmap object represents a background if the bitmap object matches the background object corresponding to the background data stored in the background object storage means.

42. The drawing processing device according to claim 34, further comprising:
    generating means for, by application software, generating one or more objects for the one-page image;
    record file generating means for generating a record file including one or more object records corresponding to the respective one or more objects, the record file further including a background identification information located in front of an object record representing a background object, the background identification information indicating that a corresponding object is a background object; and
    the determination means determines that the object is a background object if the background identification information is attached to the object record that has been fetched by the record fetching means.

43. The drawing processing device according to claim 34, further comprising:
    record file processing means for generating a processed record file from the one-page image that includes the object records drawn by the object drawing means and the additional image drawn by the additional image drawing means by sequentially converting objects included in the one-page image and an object of the additional image into the object records in the predetermined sequence;
    conversion means for converting the object records of the processed record file into one of page description language data and raster data in the predetermined sequence.

44. The drawing processing device according to claim 34, wherein:
    the object drawing means draws an object by converting a corresponding object record fetched by the record fetching means into one of page description language and raster data; and
    the additional image drawing means draws the additional image by converting the additional image into one of page description language and raster data.

45. The drawing processing device according to claim 34, further comprising:
    generating means for, by application software, generating one or more objects for the one-page image; and
    record file generating means for generating a record file including one or more object records corresponding to the respective one or more objects, the record file further including a background identification information located in front of an object record representing a background object, the background identification information indicating that a corresponding object is a background object;
    wherein
the determination means determines whether or not the object is a background object and the additional image drawing means draws the additional image after the background object has been drawn only if the application software is a presentation software.

46. The drawing processing device according to claim 34, wherein the determination means determines whether or not the object is a background object and the additional image drawing means draws the additional image after the background object has been drawn only if specified from an exterior.

47. The drawing processing device according to claim 34, wherein the additional image is in bitmap format.

48. The drawing processing device according to claim 34, wherein the additional image is a watermark.

\* \* \* \* \*